US008656011B2

(12) United States Patent
Tomita et al.

(10) Patent No.: US 8,656,011 B2
(45) Date of Patent: Feb. 18, 2014

(54) METHOD AND MANAGEMENT APPARATUS FOR DETECTING COMMUNICATION APPARATUS COUPLED TO COMMUNICATION NETWORK

(75) Inventors: Takumi Tomita, Yokohama (JP); Takeshi Arisaka, Yokohama (JP); Takaki Kuroda, Machida (JP); Yasunori Nishitani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 253 days.

(21) Appl. No.: 13/061,475

(22) PCT Filed: Nov. 17, 2010

(86) PCT No.: PCT/JP2010/070466
§ 371 (c)(1),
(2), (4) Date: Feb. 28, 2011

(87) PCT Pub. No.: WO2012/066652
PCT Pub. Date: May 24, 2012

(65) Prior Publication Data
US 2012/0124198 A1    May 17, 2012

(51) Int. Cl.
*G06F 15/173*    (2006.01)
(52) U.S. Cl.
USPC .......................................................... 709/224
(58) Field of Classification Search
USPC .......................................................... 709/224
See application file for complete search history.

(56) References Cited

U.S. PATENT DOCUMENTS

| 7,633,942 | B2 * | 12/2009 | Bearden et al. ............... | 370/392 |
| 8,014,278 | B1 * | 9/2011 | Subramanian et al. ....... | 370/229 |
| 8,130,635 | B2 * | 3/2012 | Suvi et al. .................... | 370/216 |
| 8,165,091 | B2 * | 4/2012 | Nix ............................... | 370/331 |
| 8,233,482 | B2 * | 7/2012 | Morris .......................... | 370/392 |
| 2008/0065584 | A1 | 3/2008 | Motoyama et al. | |
| 2010/0106822 | A1 | 4/2010 | Nagai et al. | |
| 2010/0146103 | A1 * | 6/2010 | Hisatomi et al. .............. | 709/224 |

FOREIGN PATENT DOCUMENTS

| JP | 2008-077513 | 4/2008 |
| JP | 2008-084314 | 4/2008 |
| JP | 2008-197828 | 8/2008 |
| JP | 2010-108063 | 5/2010 |

OTHER PUBLICATIONS

HP Systems Insight Manager 6.1 User Guide; HP Part No. 601823-002; Jun. 2010, Second Edition; pp. 27-28 and 30-32.
PCT International Search Report and Written Opinion on application No. PCT/JP2010/070466 dated Dec. 21, 2010; 5 pages (with partial English-language translation).

* cited by examiner

*Primary Examiner* — Benjamin R Bruckart
*Assistant Examiner* — Ronak Patel
(74) *Attorney, Agent, or Firm* — Foley & Lardner LLP

(57) ABSTRACT

A management apparatus stores attribute/protocol management information denoting each attribute/protocol relationship. The management apparatus, for each of multiple addresses prior to inputting the credential used to detect the communication apparatus, (A) issues a query that specifies an address, (B) upon receiving a response to this query from the communication apparatus at the address specified in this query, writes, to a storage resource, query result information denoting the corresponding relationship between the address specified in this query and the communication apparatus attribute acquired based on the response, (C) identifies the management protocol corresponding to the communication apparatus attribute denoted by the query result information from the attribute/protocol management information, and (D) decides the optimum management protocol for the address based on the identified management protocol.

13 Claims, 33 Drawing Sheets

Fig.4

| RANGE NAME 401 | START IP ADDRESS 402 | END IP ADDRESS 403 |
|---|---|---|
| RANGE_1 | 192.168.1.1 | 192.168.1.10 |
| RANGE_2 | 192.168.1.11 | 192.168.1.20 |
| RANGE_3 | 192.168.1.21 | 192.168.1.30 |

| CATEGORY NAME | SUBCATEGORY NAME | VENDOR NAME | MODEL NAME | OPTIMUM PROTOCOL NAME |
|---|---|---|---|---|
| SERVER | Windows | --- | --- | WMI |
| SERVER | Linux | --- | --- | SSH |
| SWITCH | IP | COMPANY A | M_A_001 | SNMP |
| SWITCH | IP | COMPANY A | M_A_002 | SNMP |
| SWITCH | FC | COMPANY B | M_B_001 | WBEM |
| SWITCH | FC | COMPANY B | M_B_002 | WBEM |
| SWITCH | FC | COMPANY B | M_B_003 | WBEM |
| STORAGE | FC | COMPANY C | M_C_001 | SNM2 |
| STORAGE | FC | COMPANY C | M_C_002 | SNM2 |
| STORAGE | FC | COMPANY D | M_D_001 | WBEM |

| IP address 701 | VENDOR NAME 702 | MODEL NAME 703 |
|---|---|---|
| 192.168.1.3 | COMPANY A | M_A_001 |
| 192.168.1.5 | COMPANY C | M_C_001 |

| IP address | OPEN PORT NUMBER |
|---|---|
| 192.168.1.1 | 135 |
| 192.168.1.1 | 5988 |
| 192.168.1.2 | 22 |
| 192.168.1.2 | 2049 |
| 192.168.1.3 | 22 |
| 192.168.1.4 | 22 |

| IP address | HOSTNAME |
|---|---|
| 192.168.1.1 | take |
| 192.168.1.2 | momo |
| 192.168.1.3 | ipsw001 |
| 192.168.1.4 | fcsw001 |
| 192.168.1.5 | ams2000 |

| IP address | LOGIN SCREEN URL |
|---|---|
| 192.168.1.3 | http://192.168.1.3 |
| 192.168.1.4 | http://192.168.1.4 |
| 192.168.1.5 | http://192.168.1.5 |

| IP address | VENDOR NAME | MODEL NAME | OPEN PORT NUMBER | HOSTNAME | LOGIN SCREEN URL |
|---|---|---|---|---|---|
| 1101 | 1102 | 1103 | 1104 | 1105 | 1106 |
| 192.168.1.1 | --- | --- | 135, 5988 | take | --- |
| 192.168.1.2 | --- | --- | 22, 2049 | momo | --- |
| 192.168.1.3 | COMPANY A | M_A_001 | 22 | ipsw001 | http://192.168.1.3 |
| 192.168.1.4 | --- | --- | 22 | fcsw001 | http://192.168.1.4 |
| 192.168.1.5 | COMPANY C | M_C_001 | --- | ams2000 | http://192.168.1.5 |

| PORT NUMBER | CERTAINTY FACTOR | OPTIMUM PROTOCOL NAME |
|---|---|---|
| 22 | 50% | SSH |
| 135 | 90% | WMI |
| 3389 | 90% | WMI |
| 2049 | 90% | SSH |
| 3389 | 90% | WMI |
| 5988 | 50% | WBEM |
| 5989 | 50% | WBEM |

| IP address | CERTAINTY FACTOR | INFERENCE RESULT |
|---|---|---|
| 192.168.1.1 | 90% | WMI |
| 192.168.1.1 | 50% | WBEM |
| 192.168.1.2 | 90% | SSH |
| 192.168.1.3 | 100% | SNMP |
| 192.168.1.4 | 50% | SSH |
| 192.168.1.5 | 100% | SNM2 |

| IP address | OPTIMUM PROTOCOL NAME |
|---|---|
| 192.168.1.1 | WMI |
| 192.168.1.2 | SSH |
| 192.168.1.3 | SNMP |
| 192.168.1.4 | WBEM |
| 192.168.1.5 | SNM2 |

| PORT (22) | PORT (135) | PORT (2049) | PORT (3389) | PORT (5988) | PORT (5989) | CERTAINTY FACTOR | OPTIMUM PROTOCOL NAME |
|---|---|---|---|---|---|---|---|
| V | | | | | | 50% | SSH |
| | V | | | | | 90% | WMI |
| | | V | | | | 90% | SSH |
| | | | V | | | 90% | WMI |
| | | | | V | | 50% | WBEM |
| | | | | | V | 50% | WBEM |
| V | V | | | | | 90% | WMI |
| V | | V | | | | 95% | SSH |
| V | | | V | | | 70% | WMI |
| V | | | | V | | 50% | WBEM |
| V | | | | | V | 50% | WBEM |
| | V | V | | | | 80% | WMI |
| | V | | V | | | 95% | WMI |
| ⋮ | ⋮ | ⋮ | ⋮ | ⋮ | ⋮ | ⋮ | ⋮ |
| | V | V | V | | V | 80% | WMI |
| | | V | V | V | V | 60% | WMI |
| V | V | V | V | V | | 80% | WMI |
| V | V | V | V | | V | 80% | WMI |
| V | V | | V | V | V | 80% | WMI |
| V | | V | V | V | V | 60% | WMI |
| | V | V | V | V | V | 80% | WMI |
| V | V | V | V | V | V | 80% | WMI |

Fig.25

Add Credential for Windows Servers
(use WMI protocol)

2500

User ID: Administrator
Password: ********
Retype Password: ********
Domain: localdomain Add    Cancel

Fig.32

| IP address | DETECTION STATUS | EXPLANATION |
|---|---|---|
| 192.168.1.1 | OK | DETECTION SERVER/Windows |
| 192.168.1.1 | OK | DETECTION FC SWITCH |
| 192.168.1.2 | OK | DETECTION SERVER/Unix |
| 192.168.1.3 | OK | DETECTION IP SWITCH |
| 192.168.1.4 | Warning | DETECTION UNKNOWN SSH APPARATUS |
| 192.168.1.5 | Warning | DETECTION UNKNOWN SNMP APPARATUS |

Fig.33

| IP address | DETECTION STATUS | EXPLANATION |
|---|---|---|
| 192.168.1.1 | OK | DETECTION SERVER/Windows |
| 192.168.1.2 | OK | DETECTION SERVER/Unix |
| 192.168.1.3 | OK | DETECTION IP SWITCH |
| 192.168.1.4 | OK | DETECTION FC SWITCH. THIS APPARATUS BEING MONITORED BY SMI-S PROVIDER AT [192.168.1.1] 3302 |
| 192.168.1.5 | Warning | TO DETECT Xxx STORAGE, CONFIGURE SNM2 AND INPUT SNM2 CREDENTIALS INTO MANAGEMENT SERVER 3301 |

METHOD AND MANAGEMENT APPARATUS FOR DETECTING COMMUNICATION APPARATUS COUPLED TO COMMUNICATION NETWORK

TECHNICAL FIELD

The present invention relates to the detection of an apparatus that is coupled to a communication network.

BACKGROUND ART

As this type of technology, for example, the technologies of Patent Literature 1 and Non Patent Literature 1 are known.

According to Patent Literature 1, a management server instructs that the configuration information of an apparatus be sent to an IP address, and treats the IP address of the apparatus that responds to this instruction as the monitoring-target apparatus.

According to Non Patent Literature 1, a SIM (HP System Insight Manager) selects a management protocol from multiple network management protocols (the management protocol hereinafter), and uses the selected management protocol to search for an apparatus. In a case where an apparatus is detected, the selected management protocol is used as the management protocol for this apparatus thereafter.

CITATION LIST

Patent Literature

[PTL 1]
Laid-open Japanese Patent No. 2010-108063

Non Patent Literature

[NPL 1]
"HP Systems Insight Manager 6.1 User Guide" (http://h50146.www5.hp.com/products/software/management/hpsim/), "Chapter 4: Credentials (paragraphs 27 and 28) and "Chapter 6: Detection" (paragraphs 30 through 32)

SUMMARY OF INVENTION

Technical Problem

Generally speaking, multiple types of communication apparatuses exist on a communication network. Specifically, for example, there exist different categories of communication apparatuses (for example, a server apparatus, a storage apparatus, and a switching apparatus), communication apparatuses that belong to different subcategories within the same category (for example, a Windows (registered trademark) server apparatus and a Linux (registered trademark) server apparatus), different models of communication apparatuses within the same category, and communication apparatuses in the same category that are offered by different vendors. Different types of communication apparatuses are most often supported by different management protocols. Furthermore, there may also be case where one communication apparatus is supported by two or more management protocols.

To enable multiple communication apparatuses to be monitored in a communication network like this, ordinarily multiple management protocols are supported in a management apparatus. The management protocols, for example, are WMI (Windows Management Instrumentation), SSH (Secure SHell), SNMP (Simple Network Management Protocol), WBEM (Web-Based Enterprise Management), SNM2 (Simple Navigator Modular 2), and NIS (Network Information Service).

The management protocol that the management apparatus should use when monitoring (hereinafter, the optimum protocol) may differ in accordance with the type of communication apparatus. For this reason, the management apparatus generally comprises optimum protocol management information. The optimum protocol management information denotes the optimum protocol for each type of communication apparatus. The optimum protocol, for example, is the management protocol from among the multiple management protocols that is able to acquire the most information desired by the management apparatus.

In order for the management apparatus to monitor a communication apparatus, it must first detect this communication apparatus. The detection of a communication apparatus is generally carried out via the following flow of processing.

(S1) The user (for example, the administrator) registers in the management apparatus credential required for detecting each management protocol supported by the management apparatus.

(S2) The user specifies an address range to the management apparatus.

(S3) The management apparatus carries out the following processing for each address belonging to the specified address range (typically an IP address range).

(S3a) The management apparatus uses the credential registered for each management protocol to send a command to an address destination using each management protocol. In a case where the management protocol utilized to send the command is supported by the communication apparatus at the destination address of this command, this communication apparatus returns a response with respect to this command in accordance with this management protocol.

(S3b) The management apparatus receives the response to the command sent in the above-mentioned (S3a).

(S3c) The management apparatus analyzes the response received in the above-mentioned (S3b) and determines whether detection was successful or not.

As explained above, multiple communication apparatuses of different types generally exist on a communication network. The user cannot possibly be familiar with all of the communication apparatuses. It is difficult for the user to input the correct credential for detecting a communication apparatus on a communication network like this.

Furthermore, the management apparatus can output information denoting the result of detection (for example, information denoting the success or failure of detection for each address belonging to the specified address range, and an explanation thereof), but even when the user views this information, he will not know what credential to register to be able to detect the communication apparatus at an address in the case of an address for which the detection failed. Specifically, for example, it is supposed that a first and a second management protocols are supported by a communication apparatus at a certain address (hereinafter, this address will be referred to as the "target address" and the communication apparatus located at this address will be referred to as the "target communication address" in this paragraph), and, in addition, that the first management protocol is the optimum protocol for the target communication apparatus. Furthermore, it is supposed that the port that the second management protocol uses is open in the target communication apparatus, and the port that the first management protocol uses is closed in the target communication apparatus ("the port is open" signifies a state in which coupling is possible from outside via the management protocol that uses this port). In this case, the management apparatus is not able to detect the communication apparatus using the first management protocol (the optimum protocol). Furthermore, although the management apparatus detects the communication apparatus with the second management protocol, it fails to detect that this is the target communication apparatus. Specifically, although the management apparatus learns that a communication apparatus capable of communicating using the second management protocol is at the target address, it is not able to learn what type of communication apparatus this communication apparatus is. It is because of reasons like this that it is difficult for the user to input the correct credential for detecting a communication apparatus.

Therefore, an object of the present invention is to increase the probability of the management apparatus successfully detecting a communication apparatus via a communication network.

Solution to Problem

The management apparatus stores attribute/protocol management information denoting each attribute/protocol relationship (the corresponding relationship between a communication apparatus attribute and the management protocol that is inferred to be optimum for the communication apparatus that comprises this communication apparatus attribute). The management apparatus, for each of multiple addresses prior to inputting the credential used in the detection of the communication apparatus, (A) issues a query that specifies an address, (B) upon receiving a response to this query from the communication apparatus located at the address specified in this query, writes to a storage resource query result information denoting the corresponding relationship between the address specified in this query and the communication apparatus attribute acquired based on the response, (C) identifies the management protocol corresponding to the communication apparatus attribute denoted by the query result information from the attribute/protocol management information, and (D) decides the optimum management protocol for the address based on the identified management protocol.

The management apparatus may carry out (A) through (D) for one address, and after that carry out (A) through (D) for another address, or may carry out (A) and (B) for multiple addresses, and then carry out (C) and (D) for multiple addresses. That is, after a process has ended for a single address, the next process may be carried out for this address, or after a process has ended for multiple addresses, the next process may be carried out for these multiple addresses.

BRIEF DESCRIPTION OF DRAWINGS

FIG. 4 shows an example of the configuration of an IP address management table 301.
FIG. 6 shows an example of the configuration of an optimum protocol table 305.
FIG. 7 shows an example of the configuration of a SNMP table 307.
FIG. 8 shows an example of the configuration of an open port table 309.
FIG. 9 shows an example of the configuration of a hostname table 311.
FIG. 10 shows an example of the configuration of a login screen table 313.
FIG. 11 shows an example of the configuration of a consolidated scan results table 315.
FIG. 13 shows an example of the configuration of a port knowledge table 319.
FIG. 14 shows an example of the configuration of an inference table 321.
FIG. 15 shows an example of the configuration of an optimum protocol decision table 323.
FIG. 22 shows an example of the configuration of an expanded port knowledge table 2300.
FIG. 25 shows an example of a credential input screen.
FIG. 32 shows an example of detection result information according to a conventional processing flow.
FIG. 33 shows an example of detection result information according to the first embodiment.

DESCRIPTION OF THE EMBODIMENT

Figure 1:
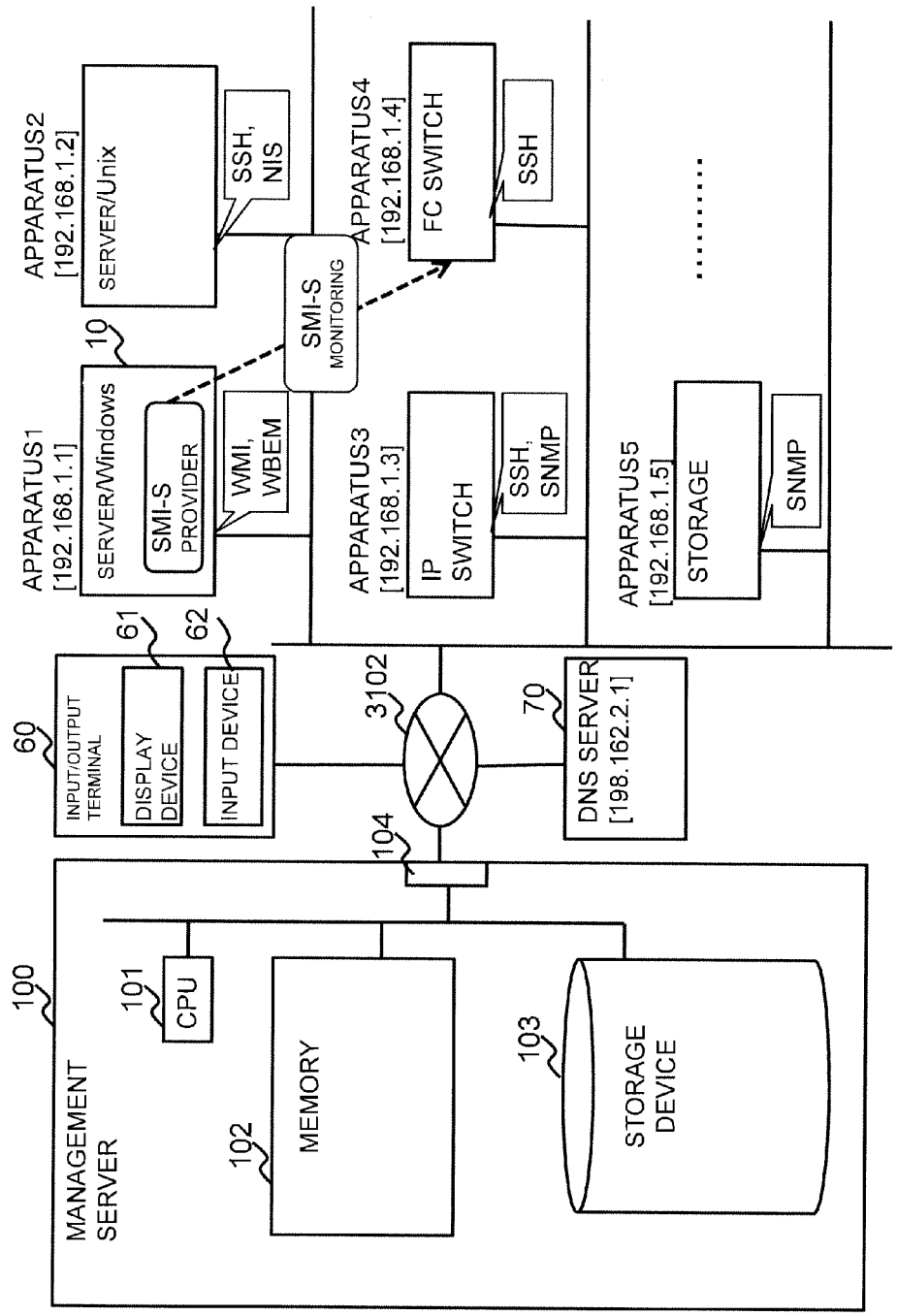
FIG. 1 shows the overall configuration of a system related to a first embodiment of the present invention.

In the following explanation, various types of information may be explained using the expression "xxx table", but the various information may also be expressed using a data structure other than a table. To show that the various information is not dependent on the data structure, "xxx table" can be called "xxx information".

Furthermore, in the following explanation, there may be cases where the processing is explained using a "program" as the subject, but since the stipulated processing may be performed in accordance with a program being executed by a processor (for example, a CPU (Central Processing Unit)) while using a storage resource (for example, a memory) and/or a communication interface device (for example, a communication port) as needed, the processor may also be used as the subject of the processing. Processing explained using the program as the subject may be processing carried out by the processor or a management apparatus comprising this processor. Furthermore, the processor may be the CPU itself or may comprise a hardware circuit that carries out either part or all of the processing performed by the processor. A program may be installed in respective controllers from a program source. The program source, for example, may be either a program delivery server or a storage medium.

Furthermore, the management apparatus may be configured from one or more computers. Specifically, for example, in a case where a management computer displays information, or in a case where the management computer sends display information to a remote computer, the management computer is the management apparatus. Furthermore, for example, in a case where the same functions as those of the management computer are realized using multiple computers, the multiple computers (may include a display computer when the display computer carries out a display) is the management apparatus. In this embodiment, a management server is the management apparatus.

Furthermore, in the following explanation, identifier and name are used as the types of identification information for various targets (for example, a vendor and a model), but these are interchangeable, and another type of identification information may be used.

Furthermore, in the following explanation, it is supposed that the following are the network management protocols (management protocols):

(*) SNMP (Simple Network Management Protocol)
(*) WMI (Windows Management Instrumentation)
(*) WBEM (Web-Based Enterprise Management)
(*) SSH (Secure SHell)
(*) SNM2 (Simple Navigator Modular 2)
(*) NIS (Network Information Service)

SNM2 is one of the vendor-specific management protocols. Another type of management protocol may be used either instead of or in addition to SNM2. Furthermore, another management protocol may be used either instead of or in addition to at least one of the above-mentioned management protocols.

Furthermore, in the following explanation, it is supposed that server apparatus, switching apparatus, and storage apparatus are communication apparatus (categories). The server apparatus, the switching apparatus, and the storage apparatus will be called the server, the switch, and the storage. Furthermore, in addition to the above-mentioned apparatuses, a UPS (Uninterruptible Power Supply) and a printer may also be included in the communication apparatus (categories).

Furthermore, in the following explanation, the port used by the management protocol yyy will be called the "yyy port".

Furthermore, in the following explanation, "the port is open" will signify a state in which a connection is possible from outside (for example, the management server) via the management protocol that uses this port. A situation in which this state is not in effect will be referred to as "the port is closed".

Furthermore, in the following explanation, the communication network is an IP (Internet Protocol) network, but another type of communication network may be used. The IP network may be a LAN (Local Area Network) or the Internet.

Furthermore, in the following explanation, an IP address is used as the address, but another type of address may be used.

A number of examples of the present invention will be explained hereinbelow by referring to the drawings, but specific examples of the problems will be explained first to make the explanation of the examples easier to understand.

Figure 31:
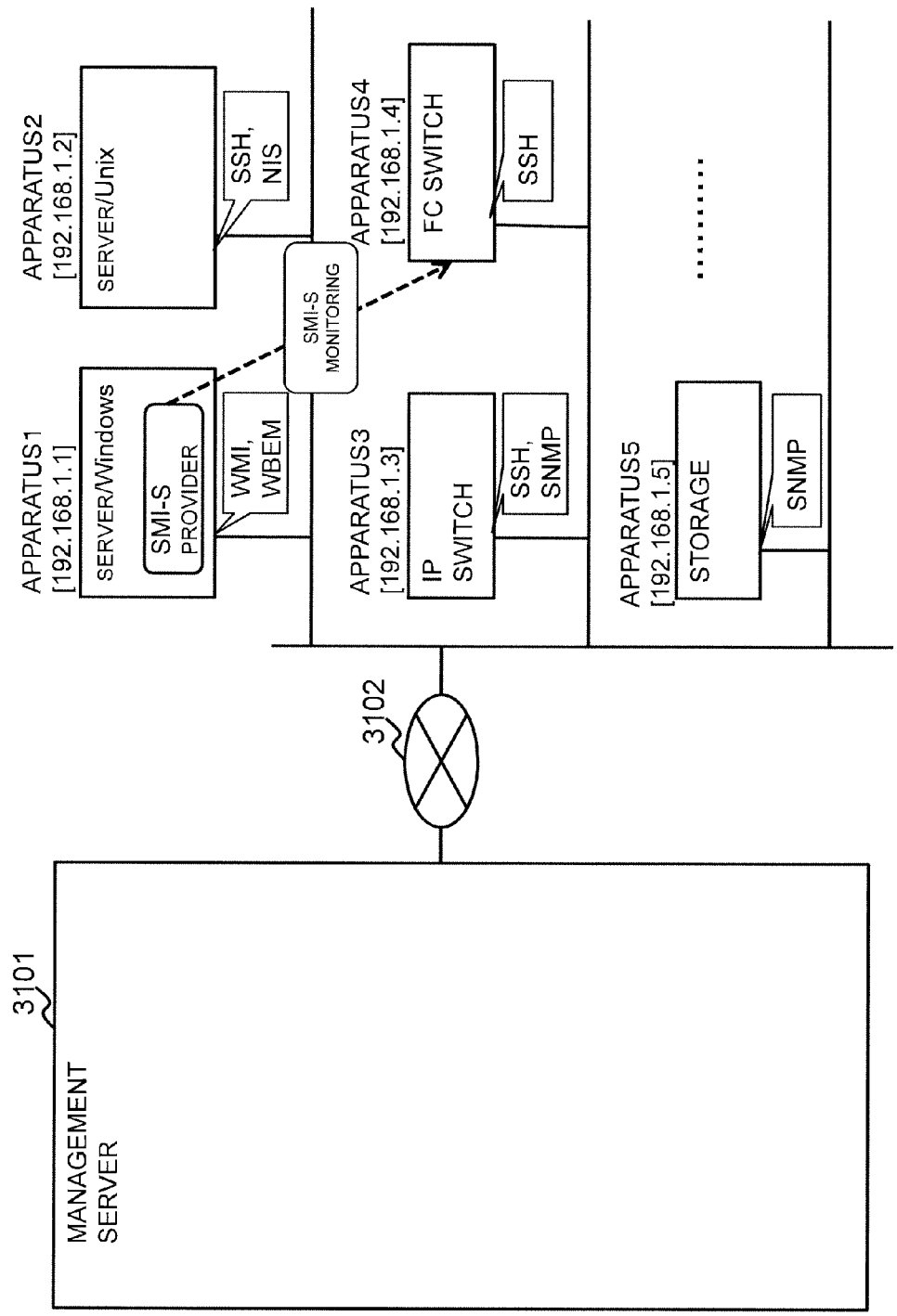
FIG. 31 shows an example of the system configuration referred to for explaining a specific example of a problem.

As shown in FIG. 31, it is supposed that there are apparatuses 1 through 5 as multiple communication apparatuses (hereinafter, apparatus) 10 in an IP network 3102. Then, it is supposed that apparatus 1 (Windows server ("Windows" is a "registered trademark")) comprises a SMI-S (Storage Management Initiative-Specification) provider function, and uses this function to monitor apparatus 4 (FC (Fibre Channel) switch). Furthermore, it is supposed that apparatus 5 (storage) comprises a SNMP port and a SNM2 port, and that the SNMP port is open but the SNM2 port is closed.

In the prior art, as described hereinabove, a user (an administrator) generally registers a credential required for detection in the management apparatus for each management protocol supported by a management server 3101. The management server 3101 uses the registered credential to issue a command specifying an IP address [192.168.1.5] with respect to each management protocol supported by the management server 3101, and determines the success or failure of detection based on a response to this command.

However, according to this processing flow, for example, the following two problems exist.

(Problem 1) For the management server 3101, it is supposed that the optimum management protocol (optimum protocol) for apparatus 5 is SNM2. However, the SNM2 port of apparatus 5 is closed. For this reason, a response to the SNM2 command is not obtained for the IP address [192.168.1.5].

Alternatively, since the SNMP port of apparatus 5 is open, a response to the SNMP command is obtained. However, SNMP is not the optimum protocol for apparatus 5. For this reason, as indicated by reference sign 3201 of FIG. 32, it is clear that the apparatus detection for the IP address [192.168.1.5] failed, and, in addition, details as to the apparatus at this address are not known (FIG. 32 shows an example of information denoting a detection result outputted by the management server 3101). Specifically, for example, it is clear that the apparatus with respect to the IP address [192.168.1.5] is one that is capable of communicating using SNMP, but the details concerning this apparatus are unknown. For this reason, it is impossible to register the credential required for the detection of the apparatus at the IP address [192.168.1.5].

(Problem 2) For the management server 3101, it is supposed that the optimum protocol for apparatus 4 is WBEM. According to a conventional processing flow, as indicated by reference sign 3202 of FIG. 32, apparatus 4 (FC switch) was detected based on the response the apparatus 1 returned to the management server 3101 with respect to the WBEM command for IP address [192.168.1.1]. Furthermore, as indicated by the reference sign 3203 of FIG. 32, based on the response that apparatus 4 returned to the management server 3101 in response to the SSH command, it is clear that the apparatus detection failed for IP address [192.168.1.4]. That is, for the same apparatus 4, there is an IP address for which the detection succeeds and there is an IP address for which the detection fails. However, it is not clear from the detection result information whether the detected apparatus 4 is being monitored directly or being monitored indirectly via apparatus 1.

Both problems 1 and 2 are solved by all of the examples 1 through 4 explained hereinbelow.

With respect to problem 1, for example, as indicated by reference sign 3301 of FIG. 33, even though the SNM2 port of apparatus 5 is closed, it is clear that the optimum protocol for apparatus 5 is SNM2. Therefore, it is clear that credential for SNM2 may be registered. Consequently, according to the first example, registering the correct credential is not difficult.

With respect to problem 2, for example, as indicated by the reference sign 3302 of FIG. 33, it is clear that apparatus 4 is being monitored by the SMI-S provider function of an apparatus located at IP address [192.168.1.1] (that is, it is an apparatus that is being monitored indirectly).

A number of embodiments of the present invention will be explained hereinbelow.

Embodiment 1

FIG. 1 shows an example of the overall configuration of a system related to a first embodiment of the present invention.

Multiple apparatuses 10 are coupled to the IP network 3102. An input/output terminal 60, a DNS (Domain Name System) server 70, and a management server 100 are coupled to the IP network 3102. As the multiple apparatuses 10, for example, there are the following apparatuses 1 through 5:

(*) Apparatus 1 (Windows server comprising IP address [162.168.1.1], a WMI port and a WBEM port);
(*) Apparatus 2 (Unix server comprising IP address [162.168.1.2], a SSH port and a NIS port);
(*) Apparatus 3 (IP switch comprising IP address [162.168.1.3], a SSH port and a SNMP port);
(*) Apparatus 4 (FC switch comprising IP address [162.168.1.1], and a SSH port); and
(*) Apparatus 5 (Storage comprising IP address [162.168.1.5], a SNMP port and a SNM2 port (the SNM2 port being in a closed state)).

The multiple apparatuses 10 are not limited to these five apparatuses 1 through 5. Multiple apparatuses of different types may be coupled to the IP network 3102 like this.

With respect to each apparatus 10, an optimum protocol exists for each apparatus type (for example, a type stipulated in accordance with at least one of a category, a subcategory, a model and a vendor). The optimum protocol is the management protocol that is capable of acquiring the most required information from among a multiple of management protocols. According to this example, the relationships between apparatus types and optimum protocols, for example, is as follows:

(*) Windows server (apparatus 1): WMI;
(*) Unix server (apparatus 2): SSH;
(*) IP switch (apparatus 3): SNMP;
(*) FC switch (apparatus 4): WBEM; and
(*) Storage (apparatus 5): SNM2.

The multiple apparatuses 10 may include not only directly monitored apparatuses, but also indirectly monitored apparatuses. The "directly monitored apparatus" is an apparatus that is being monitored by the management server 100 without going through any of the multiple apparatuses 10. Alternatively, the "indirectly monitored apparatus" is an apparatus that is being monitored by the management server 100 via any of the apparatuses of the multiple apparatuses 10. For example, in a case where a first apparatus of the multiple apparatuses 10 monitors a second apparatus of the multiple apparatuses, the second apparatus is an indirectly monitored apparatus because the second apparatus is being monitored by the management server 100 via the first apparatus. In the example of FIG. 1, apparatus 4, which is being monitored via the WBEM port of the apparatus 1 using the SMI-S provider function of the apparatus 1, is an indirectly monitored apparatus.

The DNS server 70 manages the corresponding relationship between the IP addresses uniquely allocated to the apparatuses 1 through 5 and the hostnames (of domain names) of the apparatuses 1 through 5. An IP address (the example shown in the drawing is [198.162.2.1]) is allocated to the DNS server 70.

The input/output terminal 60 comprises a display device 61 and an input device 62. For example, the input/output terminal 60 may be a general-purpose personal computer. Information that has been sent to the input/output terminal 60 from the management server 100 is displayed on the display device 61, and information that has been inputted to the input device 62 is sent to the management server 100 from the input/output terminal 60. The user is able to use the input device 62 to input required information based on various information displayed on the display device 61.

The management server 100 detects an apparatus coupled to the IP network 3102 and monitors the detected apparatus via the IP network 3102. The management server 100 comprises a NIC (Network Interface Card) 104 that is coupled to the IP network 3102, a memory 102, a storage device 103 (for example, a hard disk drive), and a CPU 101 that is coupled thereto. Another type of communication interface device may be used instead of the NIC 104, another type of storage resource may be used instead of at least one of the memory 102 and the storage device 103, and another type of processor may be used instead of the CPU 101. In this example, a below-described management program that is executed by the CPU 101 is stored in the memory 102, and various types of information are stored in the storage device 103.

Figure 2:
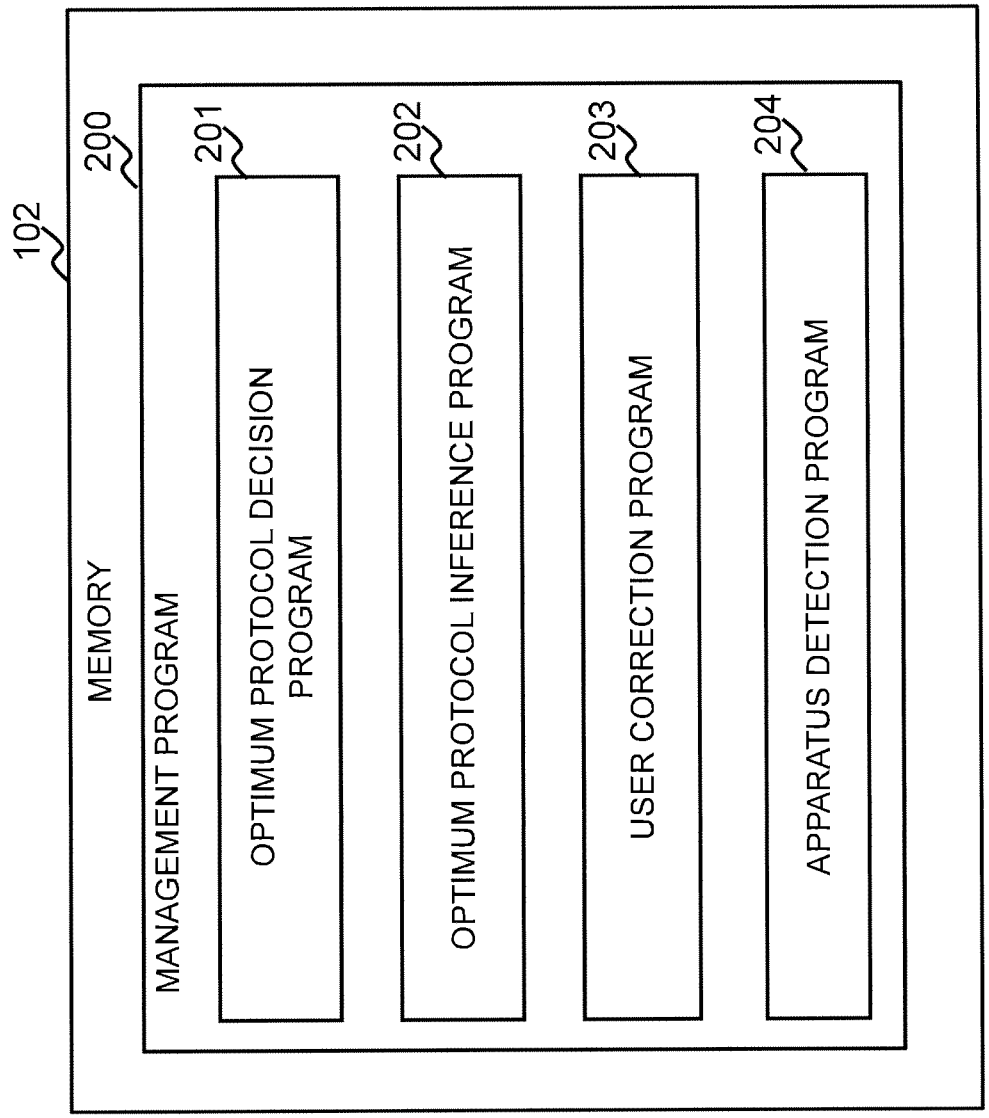
FIG. 2 shows an example of the configuration of a management program 200 stored in a memory 102.

FIG. 2 shows an example of the configuration of the management program 200 stored in the memory 102.

The memory 102 stores the management program 200. The management program 200 executes a process shown in FIG. 16. The management program 200 comprises an optimum protocol decision program 201, an optimum protocol inference program 202, a user correction program 203, and an apparatus detection program 204. Programs 201 through 204 will be explained in detail further below.

Figure 3:
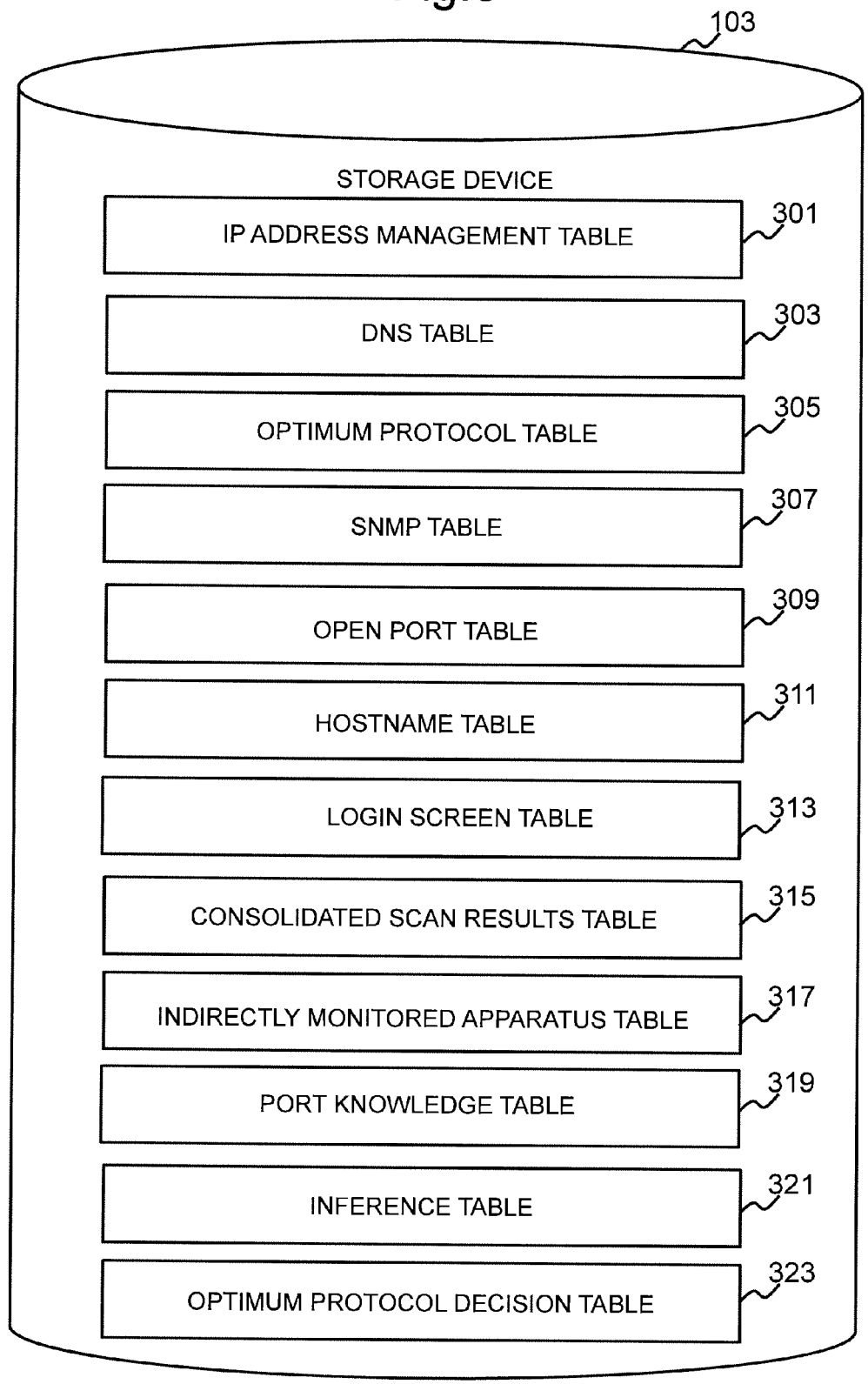
FIG. 3 shows an example of information stored in a storage device 103.

FIG. 3 shows an example of the information stored in the storage device 103.

The storage device 103 stores a target IP address management table 301, a DNS table 303, an optimum protocol table 305, a SNMP table 307, an open port table 309, a hostname table 311, a login screen table 313, a consolidated scan results table 315, an indirectly monitored apparatus table 317, a port knowledge table 319, an inference table 321, and an optimum protocol decision table 323. Of these tables shown in FIG. 3, for example, the optimum protocol table 305 and the port knowledge table 319 are stored prior to the processing shown in FIG. 16 being started. Furthermore, of the tables shown in FIG. 3, the tables other than tables 305 and 319 are created and stored during the processing shown in FIG. 16.

Each table will be explained hereinbelow.

FIG. 4 shows an example of the configuration of the IP address management table 301.

The IP address management table 301 shows ranges of IP addresses that will become targets. Specifically, for example, the table 301 comprises the following information for each IP address range:

(*) a range name 401, which is the name of an IP address range;
(*) a start IP address 402, which is the first IP address in an IP address range;
(*) an end IP address 403, which is the last IP address in an IP address range.

According to table 301, it is clear that range name "RANGE_1" comprises a range from IP address "192.168.1.1" to IP address "192.168.1.10". The values of the range name 401, the start IP address 402, and the end IP address 403 inputted by the user using the input device 62 are reflected in accordance with a display screen of the display device 61 (the display screen has been omitted from the drawing).

Figure 5:
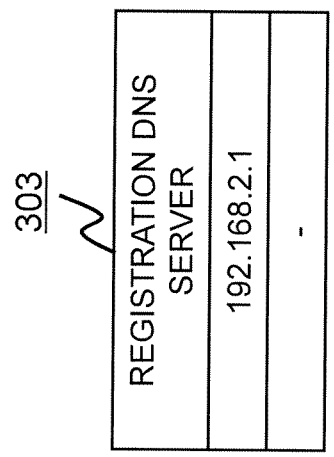
FIG. 5 shows an example of the configuration of a DNS table 303.

FIG. 5 shows an example of the configuration of the DNS table 303.

The DNS table 303 shows the IP address of the DNS server 70. According to FIG. 5, the table 303 only stores the IP address of one DNS server 70. However, multiple IP addresses may be registered in the table 303 in accordance with the number of DNS servers 70 coupled to the system. Furthermore, in a case where the DNS servers 70 are hierarchized, information related to the hierarchy may be registered in the table 303.

FIG. 6 shows an example of the configuration of the optimum protocol table 305.

The optimum protocol table 305 shows the corresponding relationship between the apparatus type and the optimum protocol. Specifically, for example, the table 305 comprises the following information for each apparatus type:

(*) a category name 601, which is the name of the apparatus category (for example, a server, a switch, and a storage);

(*) a subcategory name 602, which is the name of an apparatus subcategory (for example, a server type, a switch type, and a storage type);

(*) a vendor name 603, which is the name of the vendor;

(*) a model name 604, which is the name of the model; and (*) an optimum protocol name 605, which is the name of the optimum protocol corresponding to the apparatus type.

According to the table 305, it is clear that "WMI" is the optimum protocol for the Windows server. Furthermore, according to the table 305, it is clear that "SNMP" is the optimum protocol of the IP switch with the vendor name "Company A" and the model name "M_A_001".

FIG. 7 shows an example of the configuration of the SNMP table 307.

The SNMP table 307 is a table in which apparatus information acquired from a response to a SNMP query is registered. Specifically, for example, table 307 comprises the following information for each response to a SNMP query:

(*) an IP address 701, which is the IP address specified in the query;

(*) a vendor name 702, which is the vendor name acquired from the response; and (*) a model name 703, which is the model name acquired from the response.

According to table 307, it is clear that the vendor of the apparatus provided at IP address "192.168.1.3" is "Company A" and the model is "M_A_001". In this example, connections to apparatuses 1 through 5 are attempted using SNMP. In this connection, "Public", which is the default value of a community name, is used as the SNMP credential. In a case where a connection succeeds, the management server 100 receives a response including the vendor name and the model name. The table 307 may comprise only information related to an IP address for which a connection succeeded, or may comprise information related to an IP address for which a connection failed.

FIG. 8 shows an example of the configuration of the open port table 309.

The open port table 309 shows the number of an open port identified with respect to an IP address. Specifically, for example, the table 309 comprises the following information for each IP address specified by a port scan, which will be described further below:

(*) an IP address 801; and (*) an open port number 802, which is the number of the open port identified with respect to the IP address.

According to the table 309, it is clear that the apparatus having the IP address "192.168.1.1" comprises two open ports numbered "135" and "5988". The creation of the table 309, for example, may be carried out using a known port scan tool.

FIG. 9 shows an example of the configuration of the hostname table 311.

The hostname table 311 shows the hostname identified with respect to each IP address. Specifically, for example, the table 311 comprises the following information for each IP address specified by a hostname scan, which will be described further below:

(*) an IP address 901; and (*) a hostname 902, which is the hostname identified with respect to the IP address.

According to the table 311, it is clear that the hostname of the apparatus having IP address "192.168.1.1" is "take". This table 311 is created as follows. That is, the management program 200 identifies the IP address of the DNS server 70 from the above-described DNS table 303, and queries the DNS server 70 located at the identified IP address as to the hostname corresponding to the IP address. The management program 200 registers the hostname given in response to this query and the IP address corresponding to this hostname in the table 311.

FIG. 10 shows an example of the configuration of the login screen table 313.

The login screen table 313 shows the URL of the login screen for the IP address. Specifically, for example, table 313 comprises the following information for each IP address specified in a login screen URL scan, which will be explained further below:

(*) an IP address 1001; and (*) a URL 1002, which denotes the URL of the login screen corresponding to the IP address.

According to the table 313, it is clear that it will be possible for the apparatus having the IP address "192.168.1.3" to login using "http://192.168.1.3". The management program 200 may attempt to connect to each apparatus using the HTTP (Hyper Text Transfer Protocol), and may register the login screen URL with respect to the apparatus for which there was a response in the table 313.

FIG. 11 shows an example of the configuration of the consolidated scan results table 315.

The consolidated scan results table 315 is used to consolidate the information registered in the tables shown in FIGS. 7 through 10. Specifically, for example, table 315 comprises the following information for each IP address in the tables shown in FIGS. 7 through 10:

(*) an IP address 1101;

(*) a vendor name 1102, which is the vendor name 702 corresponding to IP address 701, which is the same as IP address 1101;

(*) a model name 1103, which is the model name 703 corresponding to IP address 701, which is the same as IP address 1101;

(*) an open port number 1104, which is the open port number 802 corresponding to IP address 801, which is the same as IP address 1101;

(*) a hostname 1105, which is the hostname 902 corresponding to IP address 901, which is the same as IP address 1101; and (*) a login screen URL 1106, which is the login screen URL 1002 corresponding to IP address 1001, which is the same as IP address 1101.

According to the table 315, it is clear that the apparatus having IP address "192.168.1.3" is the model "M_A_001"

apparatus of "Company A", that the port number "22" is open, that the hostname is "jpsw001", and that the login screen URL is "http://192.168.1.3".

Figure 12:
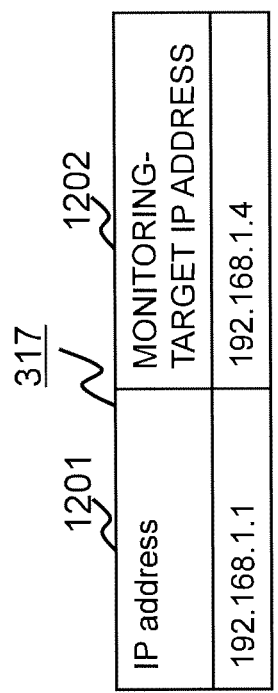
FIG. 12 shows an example of the configuration of an indirectly monitored apparatus table 317.

FIG. 12 shows an example of the configuration of the indirectly monitored apparatus table 317.

The indirectly monitored apparatus table 317 comprises information related to an apparatus that is being monitored indirectly (for example, the apparatus that is being monitored by the SMI-S provided function). Specifically, for example, the table 317 comprises the following information for each apparatus that is installed with the SMI-S provider function:

(*) an IP address 1201, which is the IP address of the apparatus installed with the SMI-S provider function; and (*) a monitoring-target IP address 1202, which is the IP address of the apparatus that constitutes the monitoring target of the apparatus installed with the SMI-S provider function.

According to this table, it is clear that an apparatus having IP address "192.168.1.4" is being monitored by the SMI-S provider installed in an apparatus having the IP address "192.168.1.1".

FIG. 13 shows an example of the configuration of the port knowledge table 319.

The port knowledge table 319 shows the corresponding relationship between an open port and an inferred optimum protocol. Specifically, for example, the table 319 comprises the following information for each port capable of being the basis of an optimum protocol inference:

(*) a port number 1301, which is the number of the port;

(*) a degree of certainty 1302, which is the probability of a protocol being the optimum protocol; and (*) an optimum protocol name 1303, which is the name of the optimum protocol.

According to the table 319, it is clear that the apparatus in which port number "22" is open has a "50%" certainty (probability) of "SSH" being the optimum protocol.

FIG. 14 shows an example of the configuration of the inference table 321.

The inference table 321 shows the probability of an optimum protocol with respect to an IP address. Specifically, for example, the table 321 comprises the following information for each IP address in the consolidated scan results table 315:

(*) an IP address 1401;

(*) a degree of certainty 1402, which shows the probability of a management protocol inferred to be optimum of being the optimum protocol; and (*) an inference result 1403, which is the name of the management protocol that has been inferred to be the optimum. According to the table 321, it is clear that there is a "90%" certainty that "WMI" is the optimum protocol for the apparatus having the IP address "192.168.1.1".

FIG. 15 shows an example of the configuration of the optimum protocol decision table 323.

The optimum protocol decision table 323 shows the optimum protocol that has been decided on for an IP address.

Specifically, for example, the table 323 comprises the following information for each IP address in the inference table 321:

(*) an IP address 1501; and (*) an optimum protocol name 1502, which is the name of the optimum protocol decided on for the IP address.

According to the table 323, it is clear that the optimum protocol "WMI" has been decided on for the apparatus having the IP address "192.168.1.1".

Next, the processing carried out using this embodiment will be explained. Furthermore, this processing may be carried out at any time. For example, this processing may be carried out when the management server 100 has coupled to the IP network 3102, or when an apparatus that is coupled to the IP network 3102 has been added, or when the management server 100 has been rebooted.

Figure 16:
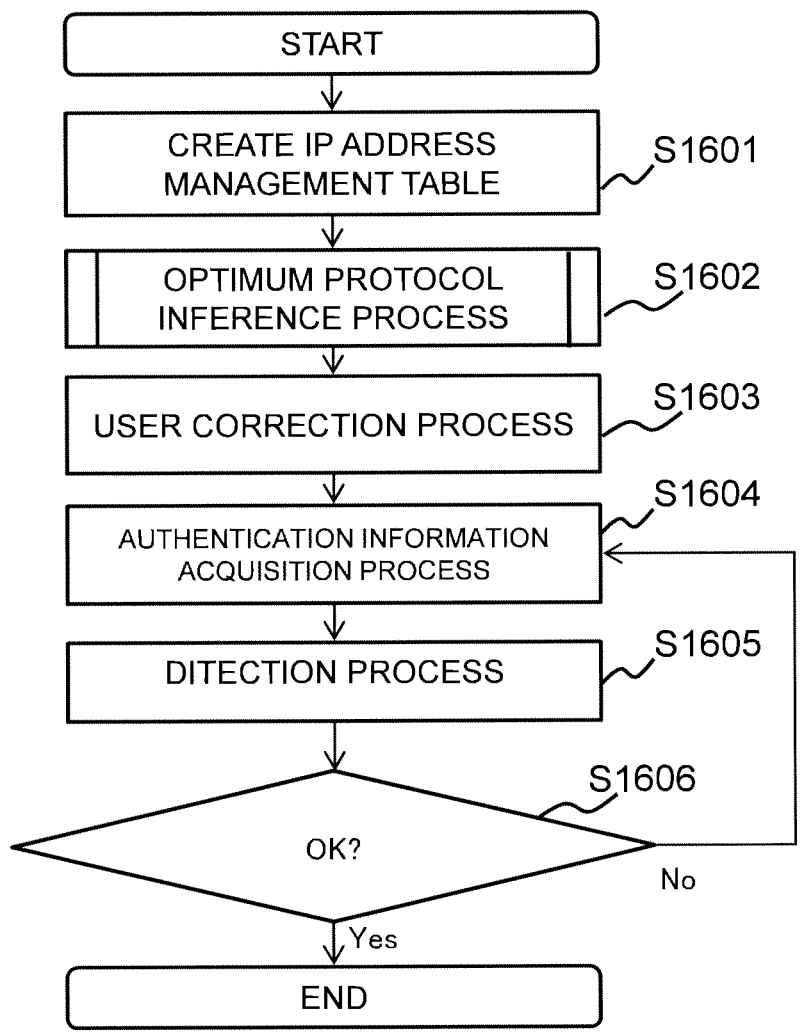
FIG. 16 is a flowchart showing an example of the processing carried out by the management program 200.

FIG. 16 is a flowchart showing an example of the processing carried out by the management program 200. An overview of the entire flow of processing carried out using this embodiment will be explained by referring to this drawing.

In S1601, the management program 200 (for example, an optimum protocol inference program 202) creates the IP address management table 301. Specifically, the program 200 carries out the following processing:

(*) sends information on a user input screen displayed on the display device 61 to the input/output terminal 60; and (*) receives from the input/output terminal 60 the information (information related to an IP address range) that the user inputted to the user input screen, and registers this information (the range name, the start IP address and the end IP address for each IP address range) in the management table 301.

In S1602, the management program 200 (for example, the optimum protocol inference program 202) executes an optimum protocol inference process. In the optimum protocol inference process, an optimum protocol is inferred with respect to each IP address belonging to the IP address range inputted by the user in S1601.

In S1603, the management program 200 (for example, the user correction program 203) executes a user correction process. In the user correction process, a determination is made by the user as to whether or not the optimum protocol inferred in S1602 is correct, and as needed, a user-determined management protocol is used as the optimum protocol for the IP address instead of the inferred optimum protocol.

The optimum protocol for the IP address is decided (determined) at the point in time when S1603 ends.

In S1604, a credential acquisition process is carried out. Specifically, the user inputs the credential for the decided optimum protocol.

In S1605, the management program 200 (for example, the apparatus detection program 204) uses the credential inputted for the optimum protocol corresponding to this IP address to carry out a detection process for each IP address.

In S1606, the management program 200 (for example, the apparatus detection program 204) determines whether or not an apparatus was detected in each IP address detection process. In a case where there is an IP address for which detection failed (S1606: No), the management program 200 (for example, the apparatus detection program 204) has the user input a different credential (returns to S1604).

In a case where an IP address for which detection failed does not exist (S1606: Yes), the processing ends.

Furthermore, for example, in a case where an apparatus coupled to IP network 3102 is added thereafter, S1602 through S1606 may be carried out only for the IP address of this apparatus.

S1602 through S1606 will be explained below in detail.

Figure 17:
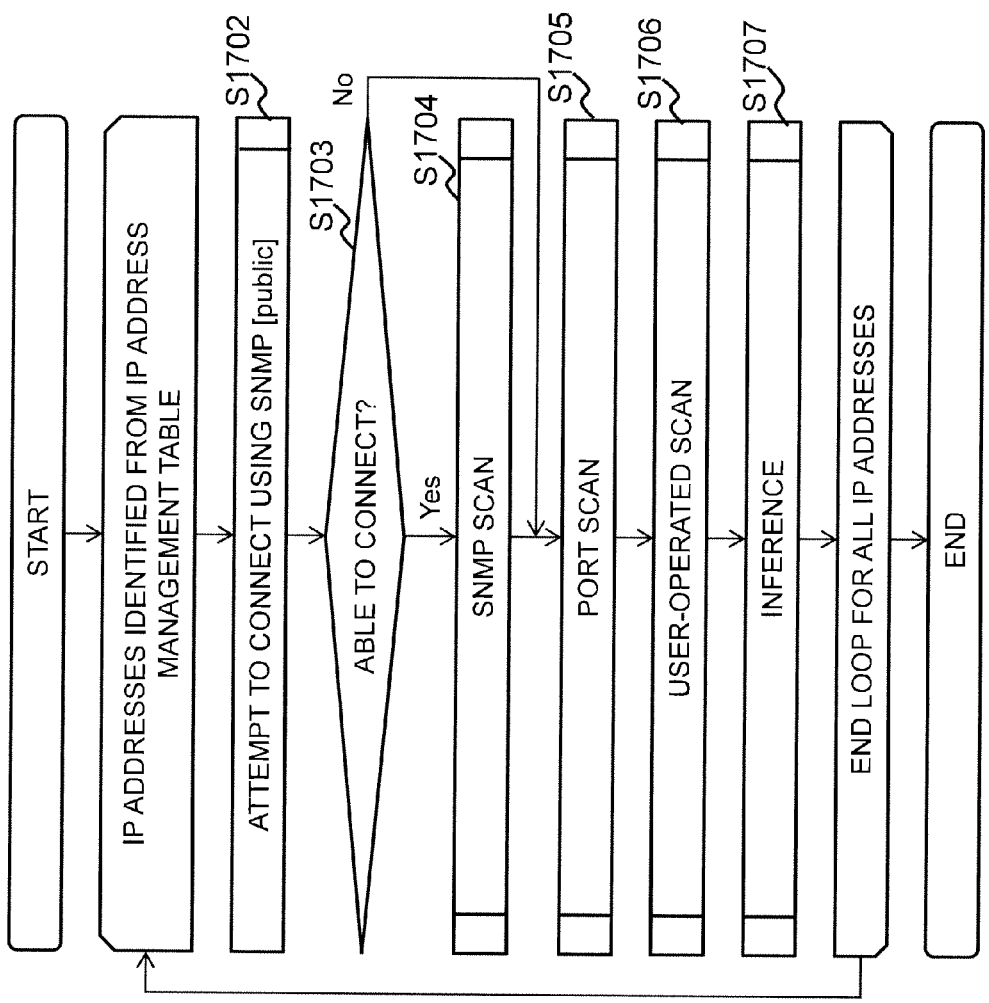
FIG. 17 is a flowchart showing an example of the flow of processing of S1602 (optimum protocol inference process) of FIG. 16.

FIG. 17 is a flowchart showing an example of the flow of processing of S1602 of FIG. 16.

The optimum protocol inference program 202 carries out the processing of S1702 and subsequent steps for each IP address that belongs to the IP address range identified from the IP address management table 301. A single IP address (hereinafter to be referred to as the target IP address in the explanation of FIG. 17) will be given as an example in the following explanation of S1702 and subsequent steps.

In S1702, the program 202 attempts to make a connection using the SNMP protocol that specified the target IP address. Specifically, for example, the program 202 sends a command that conforms to the SMNP protocol that specified the target IP address. The community name default value "Public" is configured in this command as the credential.

In S1703, the program 202 determines whether or not a connection was possible in S1702. Specifically, the program 202 determines the propriety of the SNMP protocol connection in accordance with the response to the command sent in S1702.

In a case where the determination in S1703 is that an SNMP protocol connection was possible (S1703: Yes), the program 202 carries out S1704. Alternatively, in a case where the determination in S1703 was that an SNMP protocol connection was not possible (S1703: No), the program 202 carries out S1705.

Figure 18:
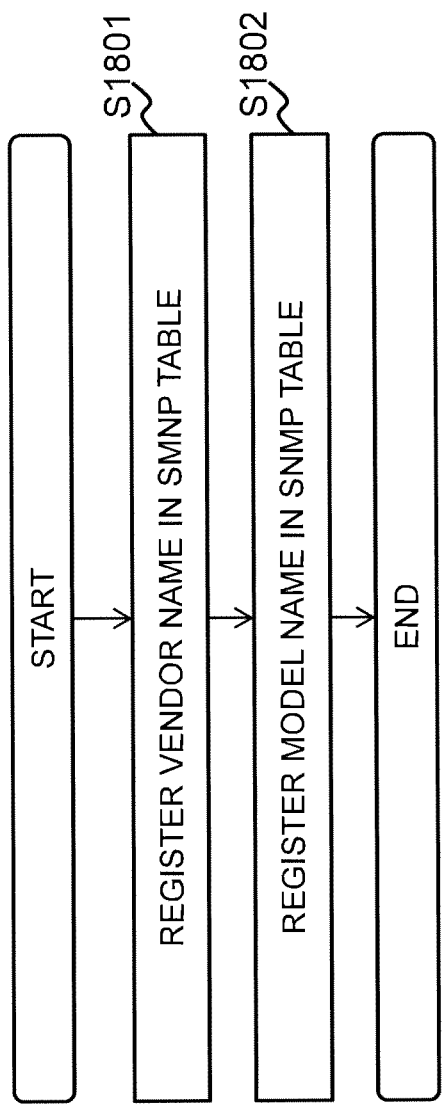
FIG. 18 is a flowchart showing an example of the flow of processing of S1704 (SNMP scan) of FIG. 17.

In S1704, the program 202 carries out a SNMP scan. The "SNMP scan" is a process for issuing a SNMP query for the target IP address, and acquiring from the response corresponding to this query information related to the apparatus that returned this response. In the SNMP scan, for example, the following processes shown in FIG. 18 are carried out.

(*) The program 202 acquires a vendor name based on a response to a SNMP query (the name of the vendor of the apparatus that returned this response), and registers this vendor name in the SNMP table 307 as the vendor name 702 corresponding to the target IP address (S1801). Specifically, for example, the program 202 queries a sysObjectID (SNMP protocol identification information denoting the type of the apparatus at the target IP address). Then, the program 202 uses information included in the response to this query to acquire a vendor name from a vendor ID table (a table that associates the sysObjectID with the vendor name) (not shown in figures) that is accessible to the public.

(*) The program 202 acquires the model name of the apparatus that returned the above-mentioned response, and registers this model name in the SMNP table 307 as the model name 703 corresponding to the target IP address (S1802). Specifically, for example, the program 202 acquires the model name from a vendor-specific MIB (Management Information Base) based on the vendor name acquired in S1801. Furthermore, the MIB is information that is made public for a network machine managed using SNMP to make its own status known externally.

Return to FIG. 17. In S1705, the program 202 carries out a port scan. The "port scan" performs a scan to determine whether or not an identified port is open with respect to the apparatus at the target IP address. The identified port, for example, port number 135 corresponding to the WMI protocol, is the port that corresponds to a protocol that the management apparatus wishes to check.

Figure 19:
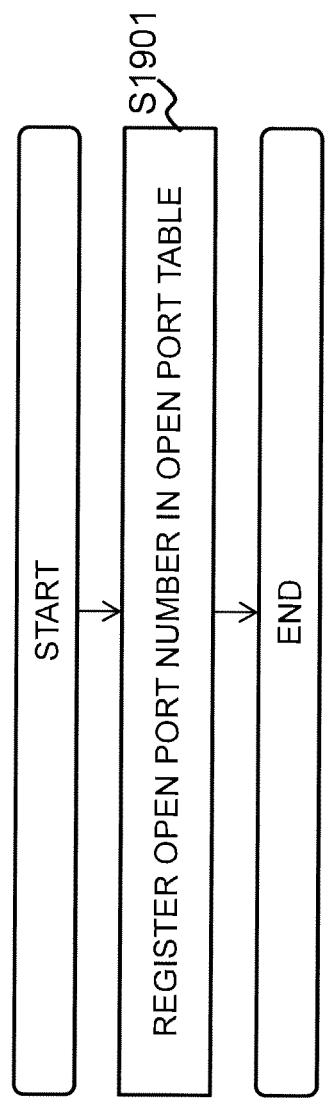
FIG. 19 is a flowchart showing an example of the flow of processing of S1705 (port scan) of FIG. 17.

In the port scan, for example, the following processes shown in FIG. 19 are carried out.

(*) The program 202 checks whether or not the identified port is open to the apparatus at the target IP address. The check, for example, is carried out based on a response when the program 202 has sent a TCP (SYN) packet to the apparatus at the target IP address. When a TCP (SYN+ACK) packet is returned as the response, the program 202 determines that the port is open. Furthermore, when a TCP (RST+ACK) packet is returned as the response, the program 202 determines that the port is closed. In a case where the port is open, the program 202 registers this port in the open port table 309 as the port number 802 corresponding to the target IP address (S1901).

Figure 20:
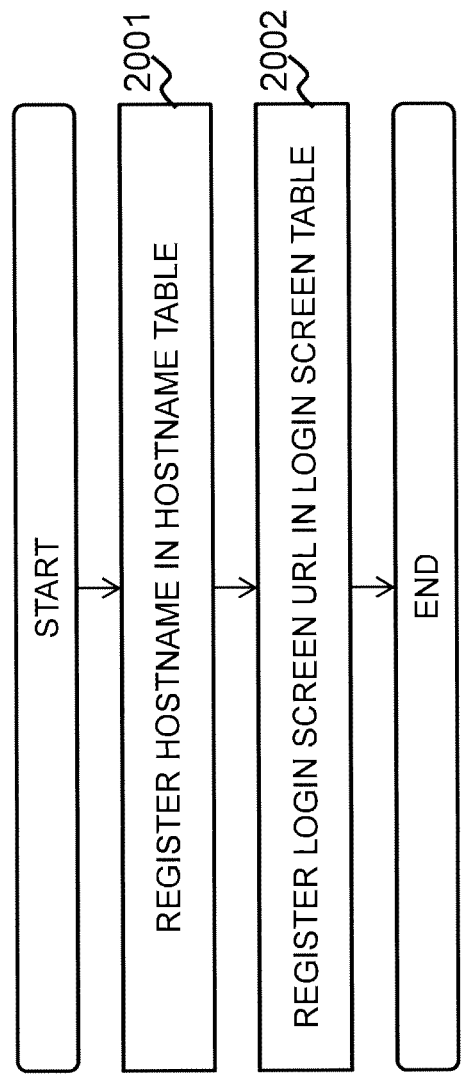
FIG. 20 is a flowchart showing an example of the flow of processing of S1706 (user-operated scan) of FIG. 17.

Return to FIG. 17. In S1706, the program 202 carries out a user-operated scan. The "user-operated scan" is a process for acquiring information capable of being used in an optimum protocol inference to increase the probability that the management protocol inferred as being the optimum protocol is in fact the optimum protocol, and is carried out in accordance with a user operation. In the user-operated scan, for example, the following processing shown in FIG. 20 is carried out.

(*) The program 202 carries out a hostname scan (S2001). Specifically, the program 202 acquires from the DNS server 70 the hostname corresponding to the target IP address, and registers the acquired hostname in the hostname table 311 as the hostname 902 corresponding to the target IP address.

(*) The program 202 carries out a login result URL scan (S2002). Specifically, the program 202 attempts to log in to the apparatus at the target IP address using HTTP. The login attempt, for example, is carried out by inputting a URL (ex: http://192.168.1.3) via a browser screen. This URL may be a URL that has been decided on the basis of the target IP address. In a case where login was possible, the program 202 registers this login screen URL in the login screen table 313 as the login screen URL 1002 corresponding to the target IP address.

In the user-operated scan, for example, a different process in which a query is issued using the Telnet protocol, and a character string of the response to this query is identified may be carried out either instead of or in addition to the above-mentioned process.

Furthermore, although not shown in the drawing, after the above-mentioned processing (the processing up to S1706) has ended, the program 202 may consolidate the information registered in the tables shown in FIGS. 7 through 10 in the consolidated scan results table 315.

Figure 21:
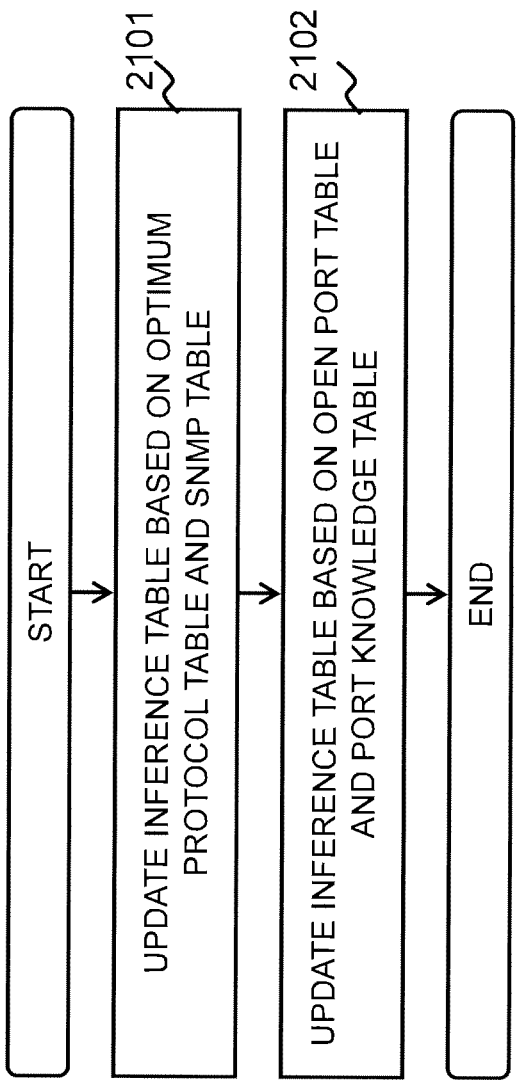
FIG. 21 is a flowchart showing an example of the flow of processing of S1707 (inference process) of FIG. 17.

Return to FIG. 17. In S1707, the program 202 carries out an inference process. In the inference process, for example, the following processing shown in FIG. 21 is carried out.

(*) The program 202 updates the inference table 321 based on the optimum protocol table 305 and the SNMP table 307 (S2101). Specifically, the program 202 first identifies the vendor name and the model name corresponding to the target IP address from the SNMP table 307. Next, the program 202 identifies the optimum protocol corresponding to these identified vendor name and model name from the optimum protocol table 305. Then, the program 202 registers the identified optimum protocol in the inference table 321 as the inference result 1403 corresponding to the target IP address. The certainty factor 1402 for this optimum protocol is 100% because the identification was carried out using the vendor name and the model name.

(*) For example, in a case where the vendor name and model name corresponding to the target IP address do not exist (or, despite the presence or absence of a vendor name and a model name corresponding to the target IP address), the program 202 updates the inference table 321 based on the open port table 309 and the port knowledge table 319 (S2102). Specifically, the program 202 first identifies the open port number corresponding to the target IP address from the open port table 309. Next, the program 202 identifies from the port knowledge table 319 the optimum protocol corresponding to this identified open port number and the certainty factor therefor. Then, the program 202 registers the name and certainty factor of the identified optimum protocol in the inference table 321 as the inference result 1403 and the certainty factor 1402 corresponding to the target IP address.

Furthermore, in a case where there are multiple open port numbers corresponding to the target IP address in the open port table 309 here, the program 202 may register the names and certainty factors of the optimum protocols respectively corresponding to these multiple open port numbers in the inference table 321 from the port knowledge table 319, or may register only the name and certainty factor of the optimum protocol having the highest open port number certainty factor, from among the names and certainty factors of these multiple optimum protocols, in the inference table 321. In so doing, even in a case where multiple sets of optimum protocol names and certainty factors corresponding to the target IP address exist, the registration of the inference results and certainty factors are registered in the inference table 321.

Furthermore, in this embodiment, an expanded port knowledge table 2300, an example of which is shown in FIG. 22, may be used instead of the port knowledge table 319. The expanded port knowledge table 2300 is a table in which a certainty factor and an optimum protocol name are associated with respect to all the combinations of one or more open port numbers. In accordance with this table 2300, an optimum protocol and the certainty factor thereof are identified regardless of whether there is one or multiple open port numbers corresponding to the target IP address.

S1602 of FIG. 16, that is, the optimum protocol inference process ends in accordance with the above. Based on the inference result and certainty factor registered in the inference table 321 via this process, S1603 of FIG. 16 (a user correction process) is carried out.

In S1603 of FIG. 16, a user correction program 203, for example, carries out the following processing:

(*) sends information of a user correction screen, (a screen for user corrections) displayed on the display device 61 to the input/output terminal 60; and (*) receives information, which the user has inputted to the user correction screen, from the input/output terminal 60, and updates the optimum protocol decision table 323 based on this information.

The user correction screen may include information shown in the consolidated scan results table 315 and the inference table 321.

Figure 23:
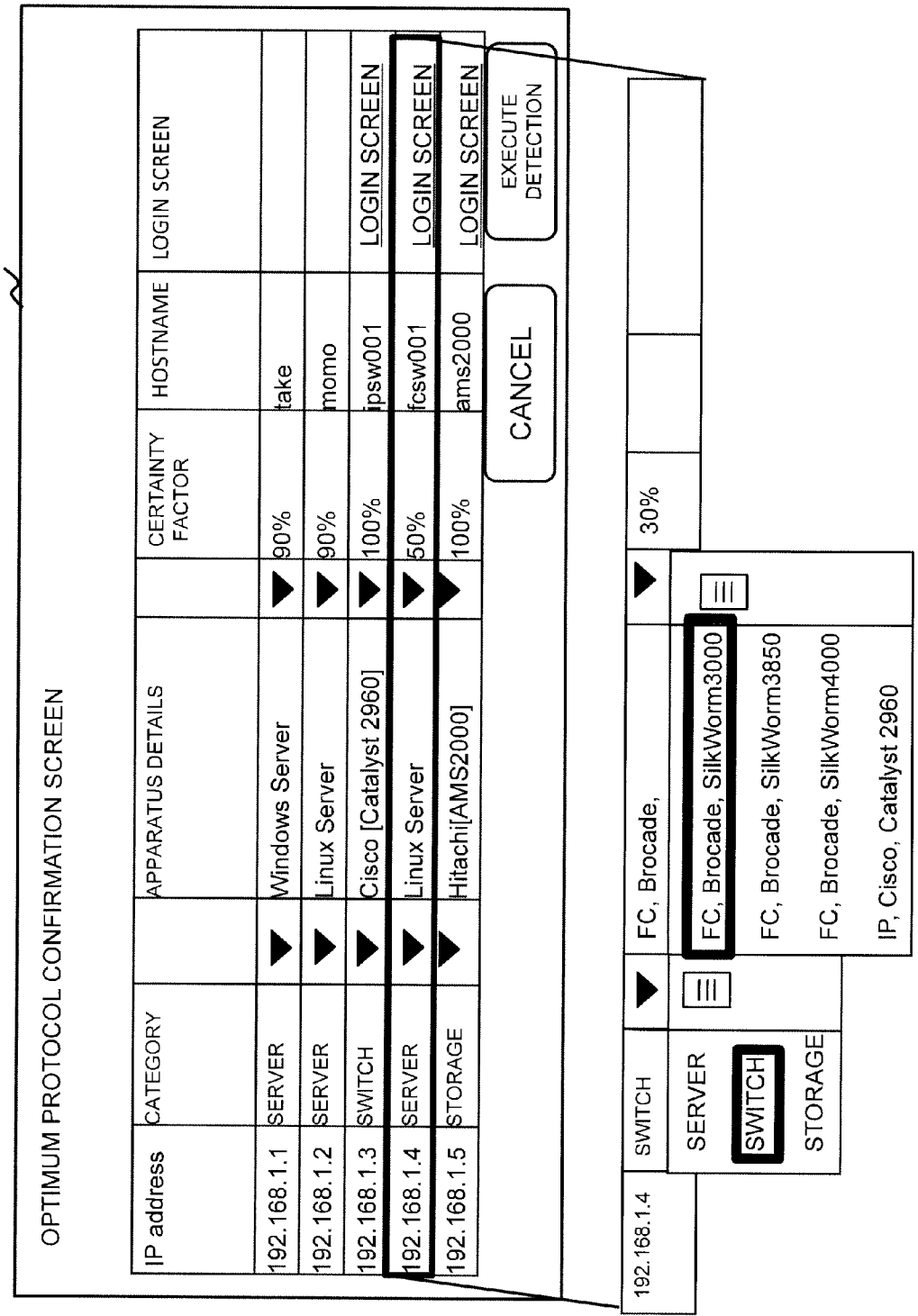
FIG. 23 shows an example of a user correction screen.

FIG. 23 shows an example of the user correction screen.

Figure 24:
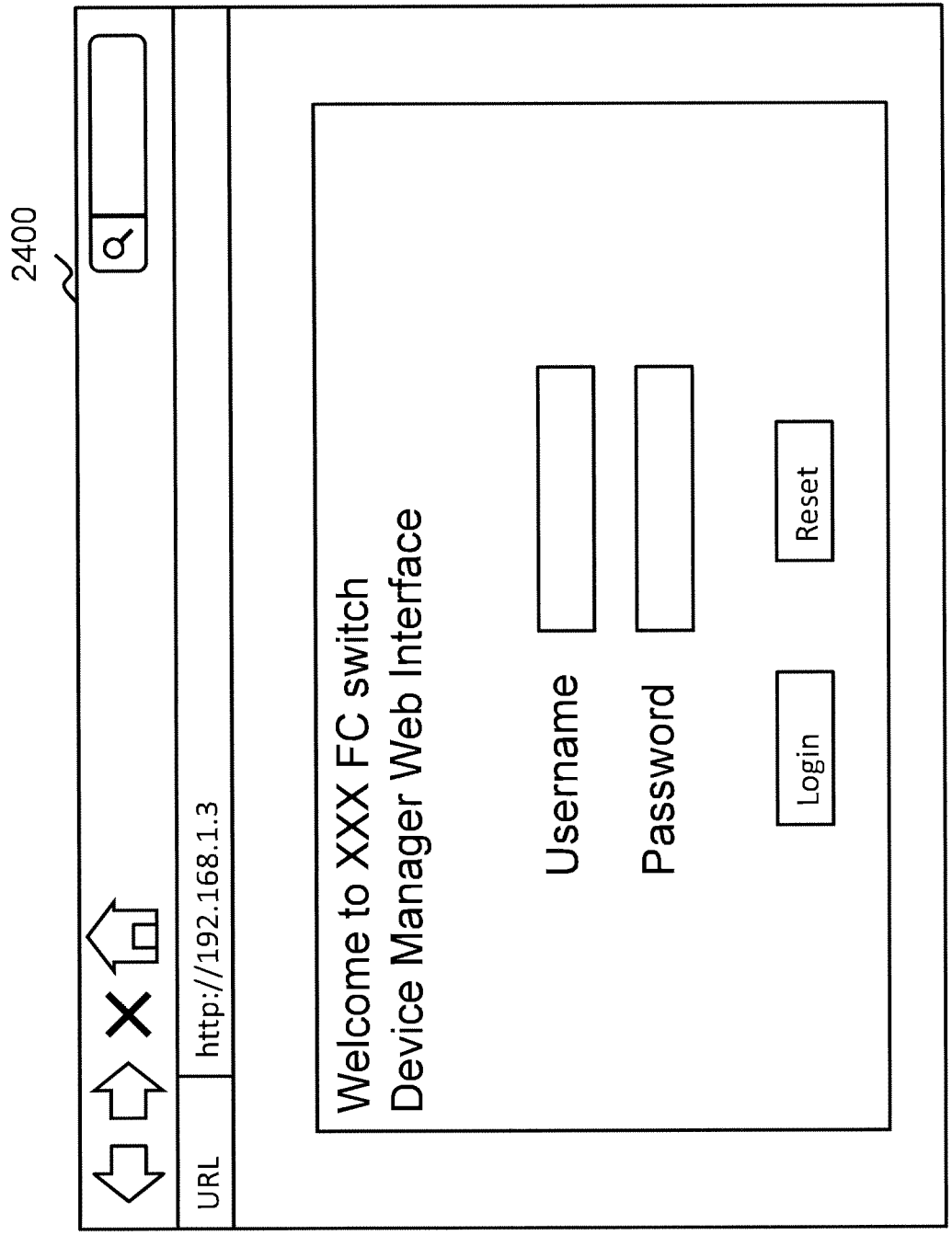
FIG. 24 shows an example of a login screen.

The user correction screen 2300 displays at least one of a category, an apparatus details (for example, a subcategory, a vendor name, a model name), a certainty factor, a hostname, and a character string "login screen", which links to a login screen URL, for each IP address denoted by the consolidate scan result table 315 and the inference table 321. By clicking on the character string "login screen", the input/output terminal 60 displays the URL login screen that is linked to this character string on the display device 61. That is, the user is able to see the login screen (FIG. 24 shows a login screen 2400, which is an example of the login screen.).

The user determines whether or not the category and the apparatus details are correct for each IP address based on the certainty factor (based also on at least one of the hostname or the login screen as needed). In a case where there is a question about the category and/or the apparatus details (for example, either a case where the certainty factor is lower than a prescribed value, or a case where it is presumed that there is an error in the corresponding relationship between the hostname and/or the login screen and the category and/or the apparatus details), the user corrects the category and/or the apparatus details. The inference, as described above, may be carried out based on the hostname. Furthermore, the inference may be carried out based on whether or not it is possible to log in from the login screen (refer to FIG. 24) displayed by clicking on the character string "login screen". The post-correction category and/or apparatus details may be selected from a category and/or apparatus details pull-down menu as illustrated in FIG. 23. In accordance with this, for example, the information (for example, the vendor name and the model name) registered in the optimum protocol table 305 (refer to FIG. 6) may be configured in the pull-down menu. The post-correction category and/or apparatus details are registered in the consolidated scan results table 315 with respect to the IP address for which the category and/or apparatus details were corrected.

In a case where the "execute detection" button on screen 2300 of FIG. 23 has been clicked, a detection execution instruction is sent to the management server 100 from the input/output terminal 60. The optimum protocol decision program 201 of the management server 100, in response to this instruction, decides on the optimum protocol for each IP address denoted by the consolidated scan results table 315 and the inference table 321. That is, the program 201 creates the optimum protocol decision table 323. Specifically, for example, the program 201 carries out the following processing for each IP address:

(*) in a case where it is possible to unequivocally identify the optimum protocol from the optimum protocol table 305 using the model name and the vendor name in the consolidated scan results table 315, registers the name of this optimum protocol in the optimum protocol decision table 323; and (*) in a case where it is not possible to unequivocally identify the optimum protocol from the optimum protocol table 305 using the model name and the vendor name in the consolidated scan results table 315, registers the name of the optimum protocol, which denotes the inference result having the highest certainty factor from among one or more inference results corresponding to an IP address in the inference table 321, in the optimum protocol decision table 323.

The preceding has been S1603 of FIG. 16 (the user correction process).

Next, in S1604 of FIG. 16, a credential acquisition process is carried out. Specifically, for example, the apparatus detection program 204 carries out the following processing for each optimum protocol denoted in the optimum protocol decision table 323:

(*) displays a credential input screen; and
(*) stores an inputted credential.

The display process, for example, sends information showing a credential input screen 2500 illustrated in FIG. 25 to the input/output terminal 60. In accordance with this, the screen 2500 is displayed on the display device 61. The user inputs credentials, such as a user ID and password, in accordance with this screen 2500.

The inputted credentials are stored in either the memory 102 or the storage device 103 of the management server 100. Furthermore, the credentials may be configured as either one or multiple types with respect to a single optimum protocol.

The preceding has been S1604 of FIG. 16 (the credential acquisition process).

Next, in S1605 of FIG. 16, the apparatus detection program 204 executes the detection process.

Figure 26:
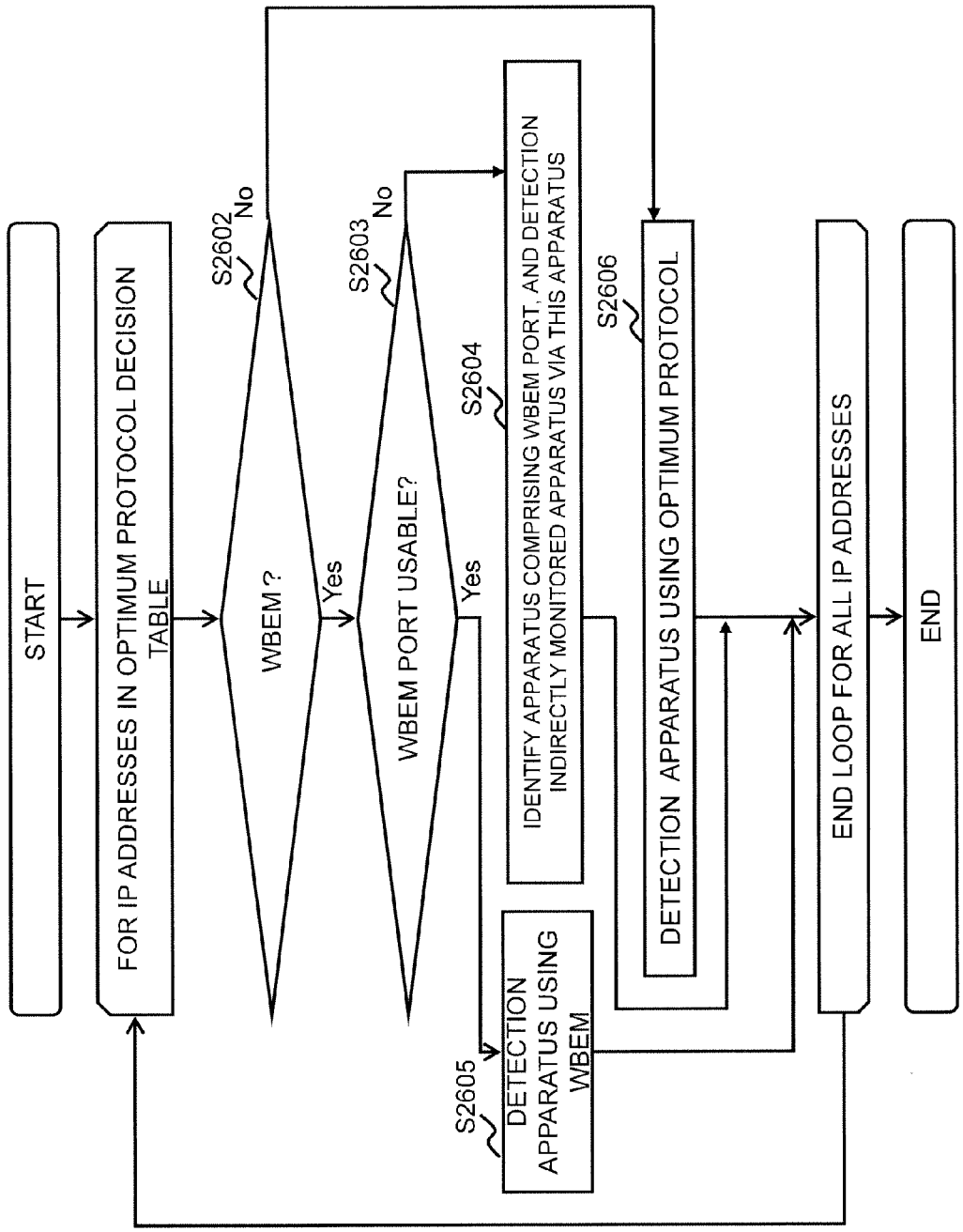
FIG. 26 is a flowchart showing an example of the flow of processing of S1605 (detection process) of FIG. 16.

FIG. 26 is a flowchart showing an example of the flow of processing of S1605 of FIG. 16 (the detection process).

The program 204 executes the processing of S2602 and subsequent steps for all the IP addresses stored in the optimum protocol decision table 323. One IP address (hereinafter to be called the target IP address in the explanation of FIG. 26) will be given as an example for explaining S2602 and subsequent steps.

In S2602, the program 204 determines whether or not the optimum protocol corresponding to the target IP address is WBEM. Specifically, the program 204, based on the optimum protocol decision table 323, determines whether or not the optimum protocol name 1502 corresponding to the target IP address is "WBEM". In a case where the result of this determination is negative (S2602: No), the program 204 moves to S2606. Alternatively, in a case where the result of this determination is affirmative (S2602: Yes), the program 204 proceeds to S2603.

In a case where S2602 is No, in S2606, the program 204 uses the credential corresponding to the optimum protocol to detect the apparatus at the target IP address with respect to the optimum protocol that corresponds to the target IP address.

In a case where S2602 is Yes, in S2603, the program 204 makes a determination as to whether or not the WBEM port of the apparatus at the target IP address can be used. Specifically, the program 204, based on the port table 309, determines whether or not the open port number corresponding to the target IP address is the port number that corresponds to the WBEM (Furthermore, information denoting the management protocol corresponding to the open port number, for example, is made public on the Internet and the like, and this determination can be made based on this information.) In a case where the result of this determination is affirmative (S2603: Yes), the program 204 moves to S2605. In a case where the result of this determination is negative (S2603: No), the program 204 proceeds to S2604.

In a case where the S2603 is Yes, in S2605, the program 204 uses the WBEM credential to detect the apparatus at the target IP address with respect to the WBEM.

In a case where the S2603 is No, in S2604, the program 204 identifies an apparatus that is able to use the WBEM port, and via this apparatus, detects an indirectly monitored apparatus (an apparatus that is being monitored indirectly). Specifically, the program 204 first, based on the open port table 309, identifies the IP address of the apparatus for which the WBEM port is open. Hereinafter, the apparatus to which this IP address has been provided will be called the provisional apparatus (in this example, the provisional apparatus is apparatus 1 of the SMI-S provider function). Next, the program 204 attempts to connect to the provisional apparatus using the WBEM. In a case where it is possible to connect to the provisional apparatus using the WBEM, the program 204 acquires from this provisional apparatus information related to one or more monitoring-target apparatuses of this provisional apparatus, and based on this information, determines whether or not there is an apparatus to which the same IP address as the target IP address has been provided among the one or more monitoring-target apparatuses of the provisional apparatus. In a case where the result of this determination is affirmative, the program 204 uses the WBEM credential to detect the indirectly monitored apparatus via the provisional apparatus. Furthermore, either in a case where the program 204 was unable to identify a provisional apparatus using the open port table 309, or a case where the program 204 was unable to connect to the provisional apparatus using the WBEM even though a provisional apparatus could be identified, the program 204 may send to the input/output terminal 60 being used by the user an instruction message to create an apparatus for managing the apparatus to which the target IP address has been provided (an instruction message to configure the SMI-S provider in the apparatus having the WBEM port).

The preceding has been S1605 of FIG. 16 (the detection process).

Next, in S1606 of FIG. 16, the program 204 determines whether or not it was possible to correctly detect an apparatus for all of the IP addresses denoted in the optimum protocol decision table 323. In a case where there is an IP address for which the detection failed (S1606: No), the program 204 has the user input a different credential with respect to this IP address (Returns to S1604).

The preceding has been an explanation of the first example. Furthermore, in a case where an apparatus detection failed due to the fact that the port being used by the optimum protocol for a certain IP address was closed during the detection process (S1606 of FIG. 16, FIG. 26), the program 204 may display on the input/output terminal 60 information denoting that the optimum protocol for this IP address is to be identified and the port being used by this optimum protocol is to be opened, and that the credential for this optimum protocol is to be inputted.

According to the first embodiment, the optimum protocol inference process (S1602 of FIG. 16) is carried out before inputting the credential. Then, based on the result of this inference process, an optimum protocol is decided for each IP address after corrections have been made by the user as needed. Since the optimum protocol determined for each IP address is a management protocol decided based on the management protocol that has been inferred to be the optimum on the basis of known information (the optimum protocol table 305 and the port knowledge table 319) and the results of various types of scans, there is a high likelihood of it being the optimum protocol. For this reason, the user to an extent precisely knows the optimum protocol for each IP address prior to the credential being inputted, and is able to input the credential on the basis of this optimum protocol. Therefore, inputting the correct credential is not difficult.

Furthermore, according to the first embodiment, as was described hereinabove, since the optimum protocol for each IP address is decided on prior to the credential being inputted, even when apparatus detection has failed due to the port corresponding to the optimum protocol being closed, it is clear that the management program 200 may open the port corresponding to the optimum protocol so that apparatus detection succeeds. For example, in a case where an apparatus detection has failed, the management program 200 is able to display on the display device 61 the detection result information indicated by reference sign 3301 of FIG. 33. The user, by viewing this information, knows that in order for the detection of the apparatus (apparatus 5) at IP address [192.168.1.5] to succeed, he can have the management program 200 open the SNM2 port of this apparatus, input a credential that conforms to SNM2, and carry out the detection process for this IP address once again.

Furthermore, according to the first embodiment, the fact that a detected apparatus is an indirectly monitored apparatus is made clear in accordance with the processing of S2604 of FIG. 26. For this reason, for example, the management program 200 is able to display on the input/output terminal 60 the detection result information indicated by the reference sign 3302 of FIG. 33. That is, information denoting not only that the detection for the apparatus at IP address [192.168.1.4] was successful, but also that this apparatus is an indirectly monitored apparatus to be monitored from an apparatus at IP address [192.168.1.4] can be displayed on the input/display terminal 60.

Embodiments 2 through 4 of the present invention will be explained below. In so doing, primarily the differences with the first embodiment will be explained, and the explanations of the points in common with the first embodiment will either be omitted or simplified. The second through the fourth embodiments described hereinbelow are used in a case where an apparatus of a different type has been added. As explained above, the optimum protocol table 305 (refer to FIG. 6), for example, is stored in advance in the management server 100. For this reason, in a case where information related to a newly added apparatus type is to be added to the optimum protocol table 305, the second through the fourth embodiments will be effective (For example, these examples will be effective in a case where a new type of apparatus has been manufactured.). The second through the fourth embodiments will be explained below.

Embodiment 2

Figure 27:
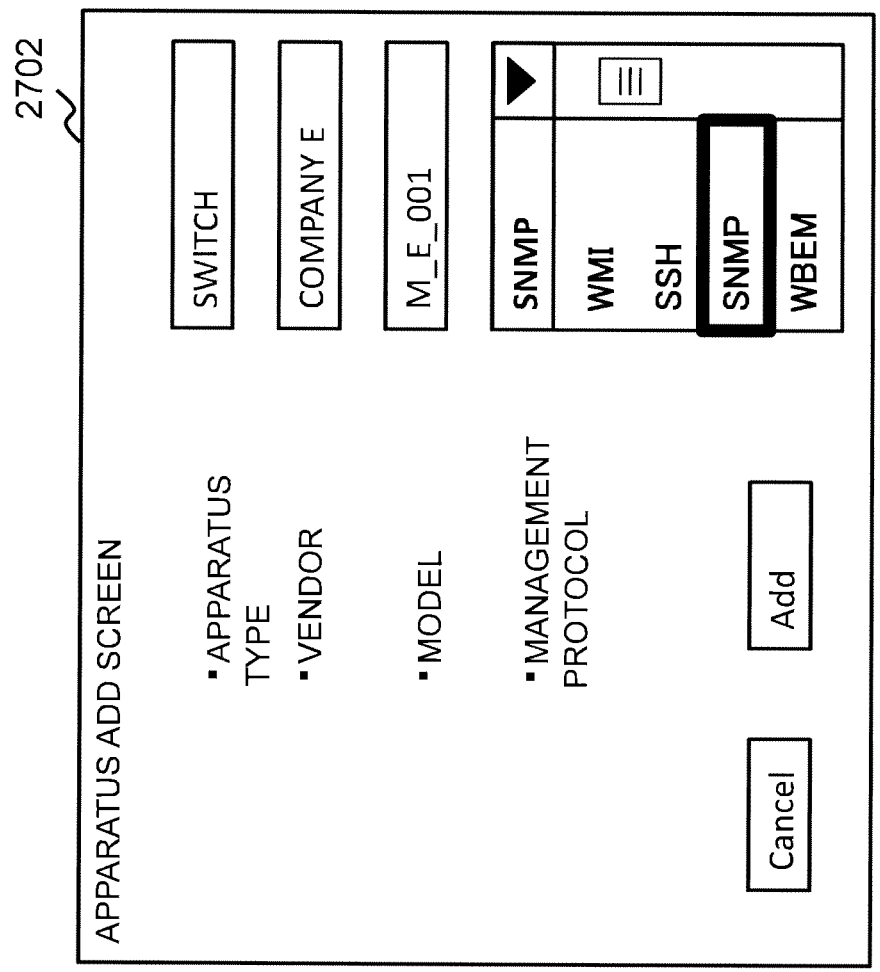
FIG. 27 shows an example of an apparatus add screen related to a second embodiment.

According to the second embodiment, the user manually adds information related to an arbitrary apparatus to the optimum protocol table 305. In this embodiment, for example, the management program (for example, the user correction program) displays a button for receiving the addition of apparatus-related information on the user correction screen. When this button is clicked, the management program displays an apparatus add screen 2702 illustrated in FIG. 27 on the input/output terminal 60. The apparatus add screen 2702, for example, is for receiving a category name, a vendor name, a model name, and an optimum protocol name. The user can add information related to an arbitrary apparatus to this apparatus add screen 2702. The information inputted to this screen 2702 is added to the optimum protocol table 305. The information added to the table 305, for example, is displayed in the pull-down menu of the user correction screen.

Embodiment 3

Figure 28:
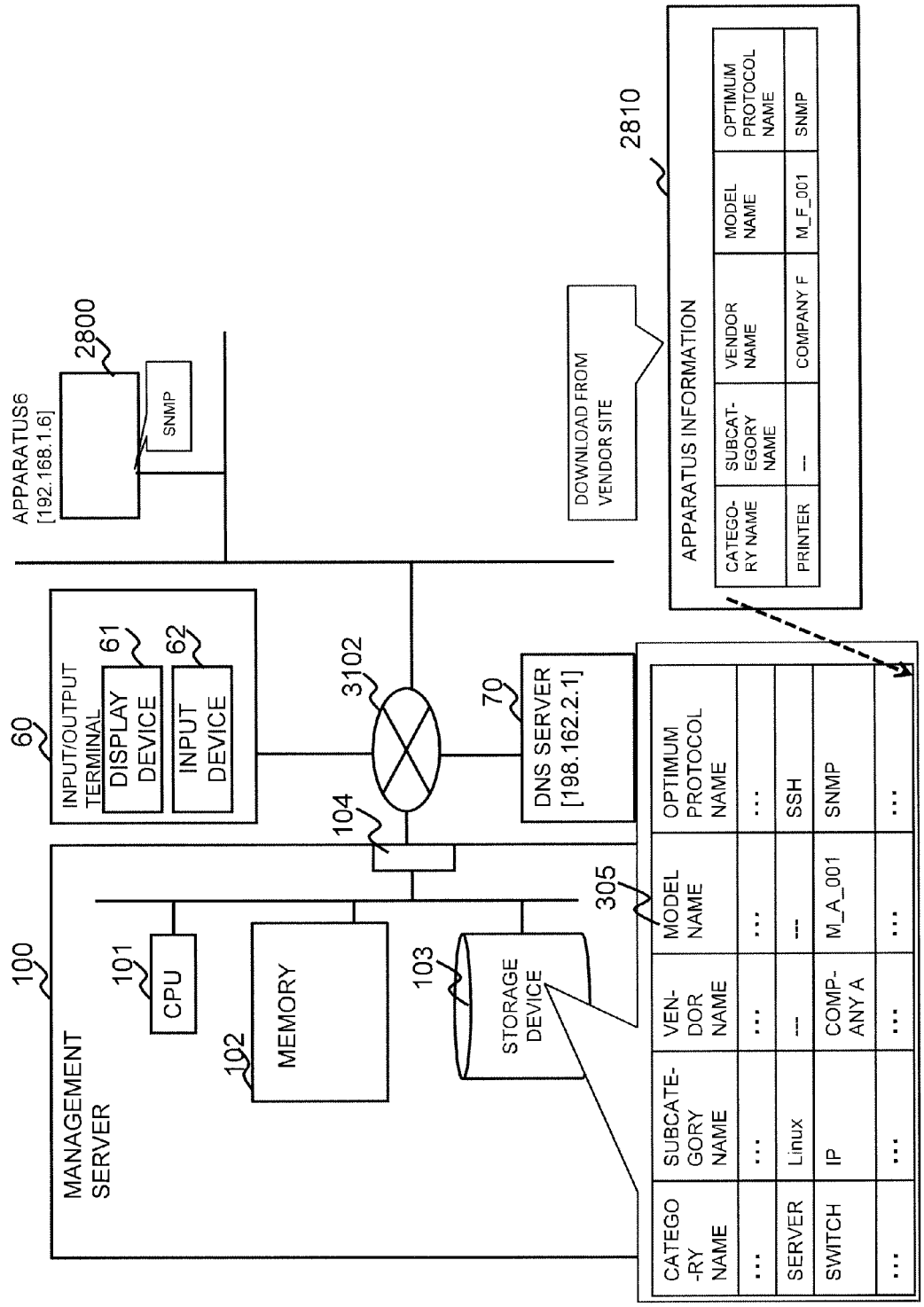
FIG. 28 shows an example of an overview of the processing carried out by a third embodiment.

According to the third embodiment, the user updates the optimum protocol table 305 based on information issued by the vendor. For example, for an apparatus 2800, which has been added to the management server 100, vendor-provided apparatus information 2810 for this apparatus 2800 is installed in the management server 100 as shown in FIG. 28. Specifically, the apparatus information 2810 is installed in the management server 100 by the user via the input/output terminal 60. The installed apparatus information 2810 is registered in the optimum protocol table 305.

Embodiment 4

Figure 29:
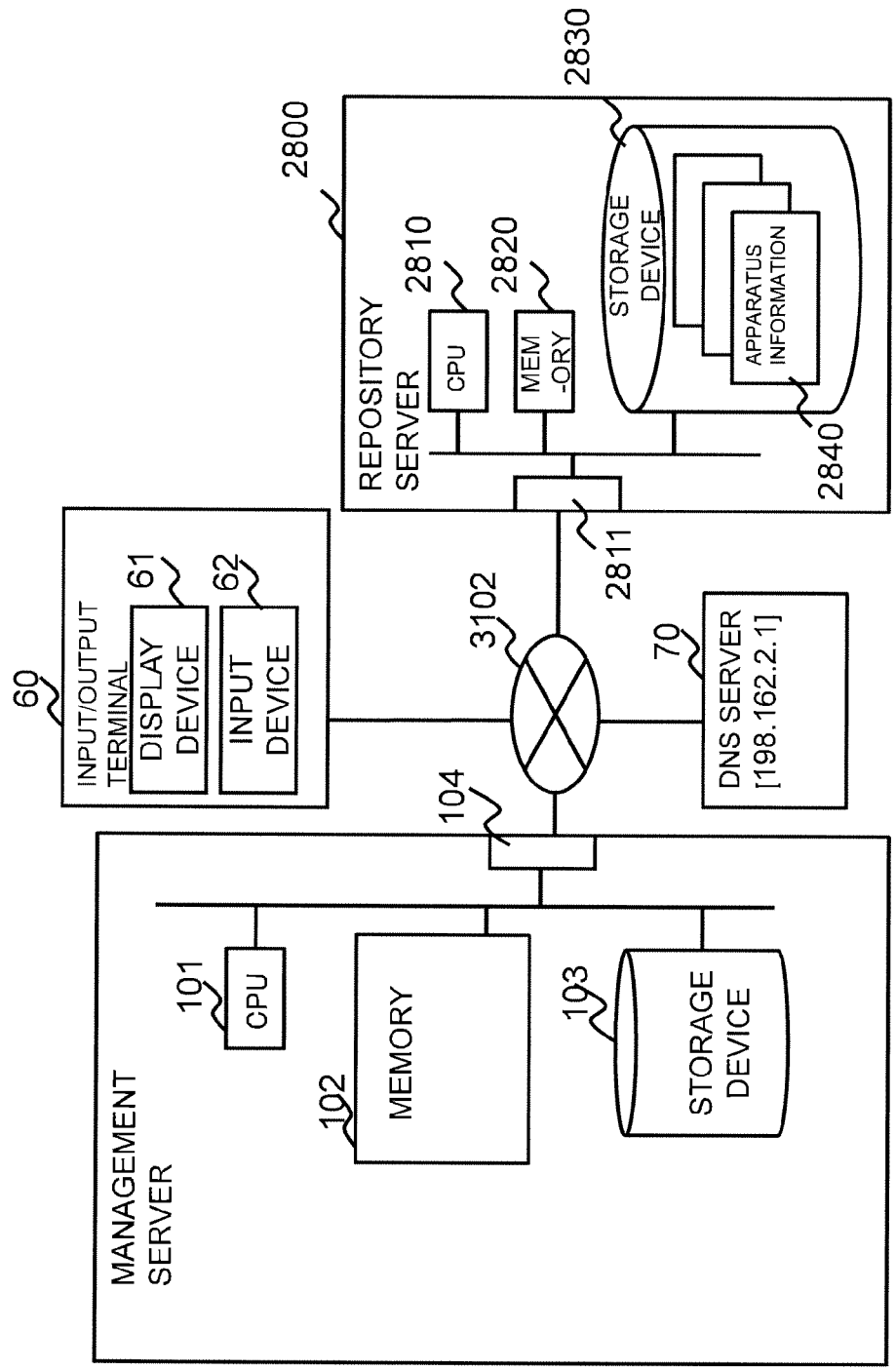
FIG. 29 shows an example of an overview of the processing carried out by a fourth embodiment.

According to the fourth embodiment, the management program 200 downloads apparatus information from a prescribed site, and registers this apparatus information in the optimum protocol table 305. For example, as shown in FIG. 29, it is supposed that a repository server 2800, in which apparatus information 2840 is stored, is coupled to the IP network 3102. The repository server 2800, for example, comprises a NIC 2811, a memory 2820, a storage device 2830, and a CPU 2810 coupled thereto just like the management server 100. The CPU 2810 downloads the apparatus information to the storage device 2830 over the IP network 3102 in accordance with executing a program stored in the memory 2820. The downloaded apparatus information 2840 is stored in the storage device 2840. The management server 100 (the management program 200) regularly (or irregularly) determines whether or not there is new apparatus information 2840 in the storage device 2830. Then, in a case where new apparatus information 2840 has been found, the management server 100 downloads the new apparatus information 2840 from the repository server 2800. The management server 100 registers the downloaded apparatus information 2840 in the optimum protocol table 305.

Figure 30:
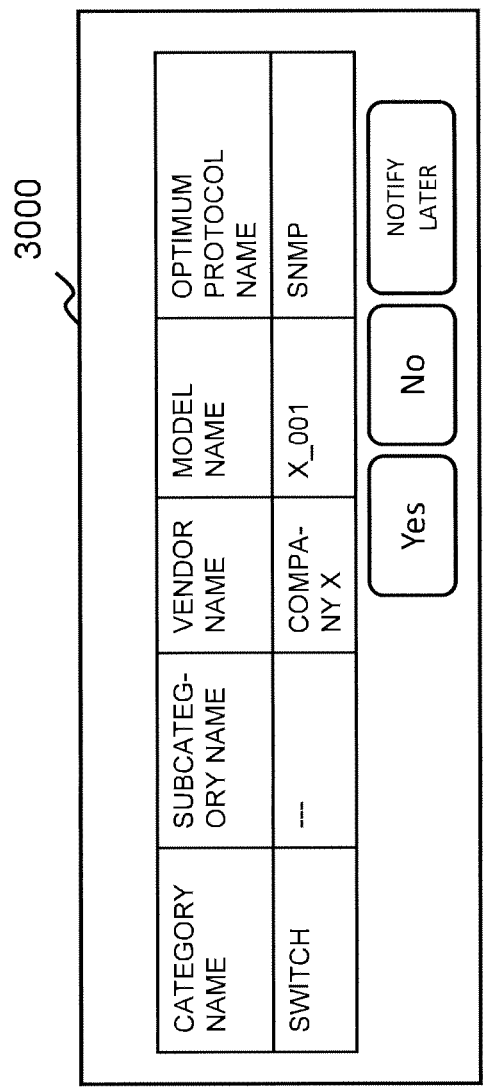
FIG. 30 shows an example of a user consent screen according to the fourth embodiment.

Furthermore, the downloading of the apparatus information 2840 and the registration of this information 2840 in the optimum protocol table 305, for example, may be carried out in a case where the management server 100 displays a screen for user confirmation (a user consent screen) 3000 on the display device 61 as shown in FIG. 30, and has obtained consent from the user via this screen 3000.

A number of embodiments of the present invention have been explained hereinabove, but these are examples for explaining the present invention, and do not purport to limit the scope of the present invention to these embodiments. The present invention can be put into practice in a variety of other modes.

REFERENCE SIGNS LIST

100 Management server
10 Communication apparatus

The invention claimed is:
1. A management apparatus comprising:
    a communication interface device which is coupled to the communication network;
    a storage resource which stores attribute/protocol management information denoting multiple attribute/protocol relationships;
    a processor which is coupled to the communication interface device and the storage resource, wherein
    the storage resource stores attribute/protocol management information denoting multiple attribute/protocol relationships, the attribute/protocol relationship is a corresponding relationship between a communication apparatus attribute and a management protocol, which is inferred to be the optimum for the communication apparatus having this communication apparatus attribute,
    the attribute/protocol management information comprises port definition information,
    each attribute/protocol relationship of the port definition information is the corresponding relationship among port identification information, a management protocol referred to be the optimum for a communication apparatus for which this port is open, and the probability that this management protocol is the optimum for the communication apparatus for which this port is open,
    and wherein
    the processor is configured to carry out the following processing for each of multiple addresses to detect an unknown communication apparatus which might exist in the multiple addresses in the communication network but is not detected by the management apparatus:
    (A) sending a query specifying an address from the management apparatus and checking that the management apparatus receives a response to this query;
    (B) writing, in a case where the response to this query has been received from the unknown communication apparatus, which is at the address specified in this query, to the storage, resource query result information, which denotes the corresponding relationship between the address specified in this query and the communication apparatus attribute acquired based on this response;
    (C) identifying from the attribute/protocol management information a management protocol that corresponds to the unknown communication apparatus attribute denoted by the query result information; and
    (D) deciding, based on the identified management protocol, the optimum management protocol for this address, and treating the unknown communication apparatus as detected,
    and wherein in a case where a connection cannot be made using a first management protocol with respect to the address:
  in the (A), the processor is configured to issue an open port identification information query with respect to the address;
  in the (B), based on this response, the identification information of one or more open ports from among one or more ports used by the communication apparatus, which is the source of this response, is acquired, and, in addition, the query result information is information denoting the corresponding relationship between the identification information of these one or more open ports and the address;
  in the (C), the processor is configured to identify from the port definition information one or more management protocols and probabilities corresponding to the identification information of one or more open ports denoted by the query result information; and
  in the (D), the decided optimum management protocol is the management protocol that has been decided on based on the one or more management protocols and probabilities.

2. A management apparatus according to claim 1, wherein the attribute/protocol management information comprises optimum protocol management information,
each attribute/protocol relationship of the optimum protocol management information is the corresponding relationship between two or more communication apparatus attributes acquired in accordance with a response to a first management protocol query and the optimum management protocol unequivocally determined from these two or more communication apparatus attributes, and wherein
in the (A), the query is issued in accordance with the first management protocol;
in the (B), the two or more communication apparatus attributes are acquired on the basis of the response, and, in addition, the query result information is information denoting the corresponding relationship between the two or more communication apparatus attributes and the address; and
in the (D), the optimum management protocol that has been decided on is the management protocol identified in the (C).

3. A management apparatus according to claim 1, wherein the processor, subsequent to the (D) is configured to:
  (E) receive an input of a credential with respect to the decided management protocol; and
  (F) carry out a detection process for detecting the communication apparatus at this address, using the inputted credential, and wherein
  in the (F), the processor is configured to:
    (f1) in a case where the optimum management protocol decided for the address is not a second management protocol, use the credential of the optimum management protocol decided for the address and detect the communication apparatus at this address;
    (f2) in a case where the optimum management protocol decided for the address is the second management protocol, and, in addition, the port for the second management protocol can be used, use the second management protocol credential and detect the communication apparatus at the address; and
    (f3) in a case where the optimum management protocol decided for the address is the second management protocol, and, in addition, the port for the second management protocol can not be used, identify, based on the query result information and the port definition information, a different address corresponding to a port that can be used by the second management protocol, query the communication apparatus at the identified different address about the communication apparatus at the address, and detect the communication apparatus at the address, and
  the communication apparatus detected in accordance with the (f3) is a communication apparatus that is monitored via the communication apparatus at the different address.

4. A management apparatus according to claim 3, wherein the first management protocol is a Simple Network Management Protocol (SNMP),
the second management protocol is a Web-Based Enterprise Management (WBEM), and
the communication apparatus at the different address is configured to monitor the communication apparatus at the address using a Storage Management Initiative-Specification (SMI-S).

5. A management apparatus according to claim 4, wherein the processor, based on inputted information, is configured to update at least one of the optimum protocol management information and the port management information.

6. A management apparatus according to claim 1, wherein the processor, subsequent to the (D) is configured to:
  (E) receive an input of a credential with respect to the decided management protocol; and
  (F) carry out a detection process for detecting the communication apparatus at the address, using the inputted credential, and wherein
  in the (F), in a case where the apparatus detection has failed on the ground that that port to be used by the optimum protocol with respect to the address is closed, the processor is configured to display information denoting that an optimum protocol for the address is to be identified and the port to be used by this optimum protocol is to be opened, and that credential for this optimum protocol is to be inputted.

7. A management apparatus according to claim 1, wherein a Domain Name System (DNS) server is coupled to the communication network, and wherein
in the (D), the processor is configured to query an apparatus name that corresponds to the address from the DNS server, and to write, to the storage resource, apparatus name/address relationship information denoting the corresponding relationship between this address and this apparatus name, and
in the (D), the decided optimum management protocol is the management protocol that has been decided based on the one or more management protocols and probabilities, and an apparatus name identified from the apparatus name/address relationship information using the address.

8. A management apparatus according to claim 1, wherein in the (D), the processor is configured to write, to the storage resource, URL/address relationship information denoting the corresponding relationship between the address and a login URL based on this address, and
in the (D), the decided optimum management protocol is the management protocol that has been decided based on the one or more management protocols and probabilities, and a login URL identified from the URL/address relationship information using the address.

9. A management apparatus according to claim 1, wherein in the (C), open port identification information corresponding to the highest probability of the identified one or more probabilities of the identification information of the identified one or more open ports is identified.

10. A management apparatus according to claim 1, wherein the processor, subsequent to the (D) is configured to:
(E) receive an input of a credential with respect to the decided management protocol; and
(F) carry out a detection process for detecting the communication apparatus at the address, using the inputted credential, and wherein
in the (F), the processor is configured to:
(f1) in a case where the optimum management protocol decided for the address is the second management protocol, and, in addition, the port for the second management protocol can not be used, identify, based on the query result information and the port definition information, a different address corresponding to a port that can be used by the second management protocol, query the communication apparatus at the identified different address about the communication apparatus at the address, and, from the response to this query, detect the communication apparatus at the address.

11. A management apparatus according to claim 10, wherein, in the (f1), the processor is configured to display information denoting that the communication apparatus at the address is to be monitored by the communication apparatus at the different address.

12. A method for detecting a communication apparatus coupled to a communication network,
the method implemented by one or more computers comprising, for each of multiple addresses to detect an unknown communication apparatus which might exist in the multiple addresses in the communication network but is not detected by a management apparatus, the steps of:
(A) sending a query specifying an address from the management apparatus and checking that the management apparatus receives a response to this query;
(B) writing to a storage resource, in a case where the response to this query has been received from the unknown communication apparatus at the address specified in this query, query result information, which denotes the corresponding relationship between an address specified in the query and a communication apparatus attribute acquired based on this response;
(C) identifying from attribute/protocol management information a management protocol that corresponds to the unknown communication apparatus attribute denoted by the query result information, with the attribute/protocol management information being information denoting multiple attribute/protocol relationships, and the attribute/protocol relationship being the corresponding relationship between a communication apparatus attribute and a management protocol that is inferred to be optimum for the communication apparatus having this communication apparatus attribute,
the attribute/protocol management information comprises port definition information,
each attribute/protocol relationship of the port definition information is the corresponding relationship among port identification information, a management protocol referred to be the optimum for a communication apparatus for which this port is open, and the probability that this management protocol is the optimum for the communication apparatus for which this port is open; and
(D) deciding, based on the identified management protocol, the optimum management protocol for the address, and treating the unknown communication apparatus as detected,
and wherein
in a case where a connection cannot be made using a first management protocol with respect to the address:
in the (A), issuing an open port identification information query with respect to the address;
in the (B), based on this response, acquiring the identification information of one or more open ports from among one or more ports used by the communication apparatus, which is the source of this response, and, in addition, the query result information is information denoting the corresponding relationship between the identification information of these one or more open ports and the address;
in the (C), identifying from the port definition information one or more management protocols and probabilities corresponding to the identification information of one or more open ports denoted by the query result information; and
in the (D), the decided optimum management protocol is the management protocol that has been decided on based on the one or more management protocols and probabilities.

13. A non-transitory computer recording storage medium storing a computer program, which is executed by a computer for detecting a communication apparatus coupled to a communication network, the computer program causing the computer to execute, for each of multiple addresses to detect an unknown communication apparatus which might exist in the multiple addresses in the communication network but is not detected by a management apparatus, the steps of:
(A) sending a query specifying an address from the management apparatus and checking that the management apparatus receives a response to this query;
(B) writing to a storage resource, in a case where the response to this query has been received from the unknown communication apparatus at the address specified in this query, query result information, which denotes the corresponding relationship between an address specified in the query and a communication apparatus attribute acquired based on this response;
(C) identifying from attribute/protocol management information a management protocol that corresponds to the unknown communication apparatus attribute denoted by the query result information, with the attribute/protocol management information being information denoting multiple attribute/protocol relationships, and the attribute/protocol relationship being the corresponding relationship between a communication apparatus attribute and a management protocol that is inferred to be optimum for the communication apparatus having this communication apparatus attribute,
the attribute/protocol management information comprises port definition information,
each attribute/protocol relationship of the port definition information is the corresponding relationship among port identification information, a management protocol referred to be the optimum for a communication apparatus for which this port is open, and the probability that this management protocol is the optimum for the communication apparatus for which this port is open; and (D) deciding, based on the identified management protocol, the optimum management protocol for the address, and treating the unknown communication apparatus as detected, and wherein in a case where a connection cannot be made using a first management protocol with respect to the address:
- in the (A), issuing an open port identification information query with respect to the address;
- in the (B), based on this response, acquiring the identification information of one or more open ports from among one or more ports used by the communication apparatus, which is the source of this response, and, in addition, the query result information is information denoting the corresponding relationship between the identification information of these one or more open ports and the address;
- in the (C), identifying from the port definition information one or more management protocols and probabilities corresponding to the identification information of one or more open ports denoted by the query result information; and
- in the (D), the decided optimum management protocol is the management protocol that has been decided on based on the one or more management protocols and probabilities.

* * * * *